US007788808B1

(12) United States Patent
Ptak

(10) Patent No.: US 7,788,808 B1
(45) Date of Patent: Sep. 7, 2010

(54) METHOD OF MAKING AN EQUIPMENT ENGINE MOUNTING SYSTEM

(75) Inventor: Keith R. Ptak, Erie, PA (US)

(73) Assignee: LORD Corporation, Cary, NC (US)

( * ) Notice: Subject to any disclaimer, the term of this patent is extended or adjusted under 35 U.S.C. 154(b) by 857 days.

(21) Appl. No.: 11/363,140

(22) Filed: Feb. 27, 2006

Related U.S. Application Data

(60) Provisional application No. 60/656,569, filed on Feb. 25, 2005, provisional application No. 60/659,802, filed on Mar. 9, 2005, provisional application No. 60/663,822, filed on Mar. 21, 2005, provisional application No. 60/667,498, filed on Apr. 1, 2005.

(51) Int. Cl.
*B21D 53/88* (2006.01)
(52) U.S. Cl. .................. 29/897.2; 29/436; 248/636; 248/638; 248/635; 248/562
(58) Field of Classification Search ............ 29/897.2, 29/436; 248/562, 636, 637, 638, 640, 634, 248/635; 264/261, 259
See application file for complete search history.

(56) References Cited

U.S. PATENT DOCUMENTS 2,705,118 A  3/1955 Beck (Continued)

FOREIGN PATENT DOCUMENTS

JP  09-123770  5/1997

(Continued)

OTHER PUBLICATIONS

LORD Corporation, "Vibration, Shock and Motion Control Products for Industrial Equipment", 2000, pp. 70-71.

(Continued)

*Primary Examiner*—David P Bryant
*Assistant Examiner*—Sarang Afzali
(74) *Attorney, Agent, or Firm*—Edward F. Murphy

(57) ABSTRACT

An equipment engine mounting system/method for mounting an equipment engine to an equipment frame. The equipment engine mounting system includes a first engine mount disposed between the equipment engine and the equipment frame, including a first engine mount nonextensible inner member having an outer bonding surface. The first engine mount including a first engine mount nonextensible outer member, the first engine mount nonextensible outer member having an inner bonding surface. The first engine mount includes an intermediate elastomer between the first engine mount nonextensible inner member and the first engine mount nonextensible outer member, the first engine mount intermediate elastomer bonded to the first engine mount nonextensible inner member outer bonding surface and the first engine mount nonextensible outer member inner bonding surface. The first engine mount includes a liquid housing cavity, containing a first variable volume liquid chamber proximate the first engine mount nonextensible inner member and a second variable volume liquid chamber, distal from the first engine mount nonextensible inner member. The equipment engine mounting system includes a second engine mount disposed between the equipment engine and the equipment frame, the second engine mount including a second engine mount nonextensible frameside member and a second engine mount nonextensible engineside member, and a highly damped elastomer between the second engine mount nonextensible frameside member and the second engine mount nonextensible engineside member, with the engine mounting system mounts inhibiting a transmission of a vibration of the equipment engine to the equipment frame.

4 Claims, 28 Drawing Sheets

U.S. PATENT DOCUMENTS

| | | | |
|---|---|---|---|
| 4,159,091 A | 6/1979 | Le Salver et al. | |
| 4,207,960 A | 6/1980 | Hashimoto | |
| 4,213,718 A | 7/1980 | Lumby | |
| 4,487,285 A | 12/1984 | Tomita et al. | |
| 4,504,035 A | 3/1985 | Hori | |
| 4,625,939 A | 12/1986 | Bergelt | |
| 4,638,981 A | 1/1987 | Sciortino | |
| 4,651,978 A | 3/1987 | Grafstrom | |
| 4,660,813 A | 4/1987 | Reuter | |
| 4,673,169 A | 6/1987 | Heitzig | |
| 4,682,753 A | 7/1987 | Clark | |
| 4,697,793 A | 10/1987 | Reuter et al. | |
| 4,709,898 A | 12/1987 | Yoshida et al. | |
| 4,717,111 A | 1/1988 | Saito | |
| 4,738,434 A | 4/1988 | Marjoram et al. | |
| 4,741,519 A | 5/1988 | Dubos et al. | |
| 4,757,981 A | 7/1988 | Hartel | |
| 4,765,601 A | 8/1988 | Miller et al. | |
| 4,773,634 A | 9/1988 | Hamaekers | |
| 4,789,144 A | 12/1988 | Brenner | |
| 4,811,919 A | 3/1989 | Jones | |
| 4,828,234 A | 5/1989 | Hoying et al. | |
| 4,830,346 A | 5/1989 | Eberhard et al. | |
| 4,834,349 A | 5/1989 | Arai et al. | |
| 4,905,956 A | 3/1990 | Zemlicka et al. | |
| 4,969,632 A | 11/1990 | Hodgson et al. | |
| 4,997,168 A | 3/1991 | Kato | |
| 4,997,169 A | 3/1991 | Nakamura et al. | |
| 4,998,345 A | 3/1991 | Funahashi et al. | |
| 5,020,782 A | 6/1991 | Freudenberg et al. | |
| 5,127,607 A | 7/1992 | McGuire | |
| 5,172,894 A | 12/1992 | Hein et al. | |
| 5,219,037 A | 6/1993 | Smith et al. | |
| 5,242,146 A | 9/1993 | Tecco et al. | |
| 5,295,671 A * | 3/1994 | Nakagaki et al. | 267/140.13 |
| 5,388,811 A | 2/1995 | Marjoram | |
| 5,390,758 A | 2/1995 | Hunter et al. | |
| 5,443,245 A | 8/1995 | Bellamy et al. | |
| 5,452,884 A | 9/1995 | Gugsch et al. | |
| 5,488,081 A | 1/1996 | Halladay | |
| 5,788,372 A | 8/1998 | Jones et al. | |
| 5,876,013 A | 3/1999 | Ott | |
| 5,918,833 A | 7/1999 | Najand et al. | |
| 6,009,983 A | 1/2000 | Stamps et al. | |
| 6,213,240 B1 | 4/2001 | Buell | |
| 6,315,072 B1 | 11/2001 | Brown et al. | |
| 6,547,207 B1 | 4/2003 | Thompson | |
| 6,588,530 B2 | 7/2003 | Keller et al. | |
| 6,637,734 B2 | 10/2003 | Thomazeau et al. | |
| 6,695,106 B2 | 2/2004 | Smith et al. | |
| 6,799,754 B1 | 10/2004 | Bodie et al. | |
| 6,846,018 B2 | 1/2005 | Dennert et al. | |
| 6,902,023 B2 | 6/2005 | Brendelson et al. | |
| 2003/0011116 A1 | 1/2003 | Kodama et al. | |
| 2004/0201150 A1 | 10/2004 | Okanaka et al. | |
| 2005/0077662 A1 | 4/2005 | Garety et al. | |
| 2005/0178596 A1 | 8/2005 | Brendelson et al. | |

FOREIGN PATENT DOCUMENTS

JP 09123770 A * 5/1997

OTHER PUBLICATIONS

Podesta, LORD Corporation, "User's Guide to the Application of Fluidlastic Mounts," LL-7418.

Corcoran et al., "Hydraulic Engine Mount Characteristics", International congress & Exposition, Detroit, MI, Feb. 27-Mar. 2, 1984, pp. 29-34, SAE #840407.

Flower, "Understanding Hydraulic Mounts for Improved Vehicle Noise, Vibration and Ride Qualities," Surface Vehicle Noise and Vibration Conference, Traverse City, MI, May 15-17, 1985, pp. 123-132, SAE #850975.

Flower, LORD Corporation, "Updating a 30-Year Old Concept in Vibration Control," LL-7005.

LORD Corporation, "Fluidlastic Mounts: The New Generation of Elastomeric Mounts," 1997.

LORD Mechanical Products, "Engineering Guide and catalog for Vibration, Shock and Noise Control Products", 1998, pp. 18-19.

DuPont, www.dupont.com, Website pages "Processing Techniques for Vamac", Mar. 31, 2005.

DuPont, www.dupont.com, Website pages "DuPont Vamac Polymers, Formulating and Processing Techniques", Mar. 31, 2005.

DuPont, www.dupont.com, Website pages "Vamac Formulating and Compounding Overview", Mar. 31, 2005.

DuPont, www.dupont.com, Website pages "High Performance Acrylic Rubber Compounds Made with DuPont Vamac Ethylene . . . ", Mar. 31, 2005.

DuPont, www.dupont.com, Website pages "Vamac Polymer and Performance Overview", Mar. 31, 2005.

Cooper Standard, www.cooperstandard.com, Website page "Cooper Standard Automotive: Hydraulic Engine Mounts", May 24, 2005.

Cooper Standard, www.cooperstandard.com, Website page "Cooper Standard Automotive: Engine Mount Comparison", May 24, 2005.

* cited by examiner

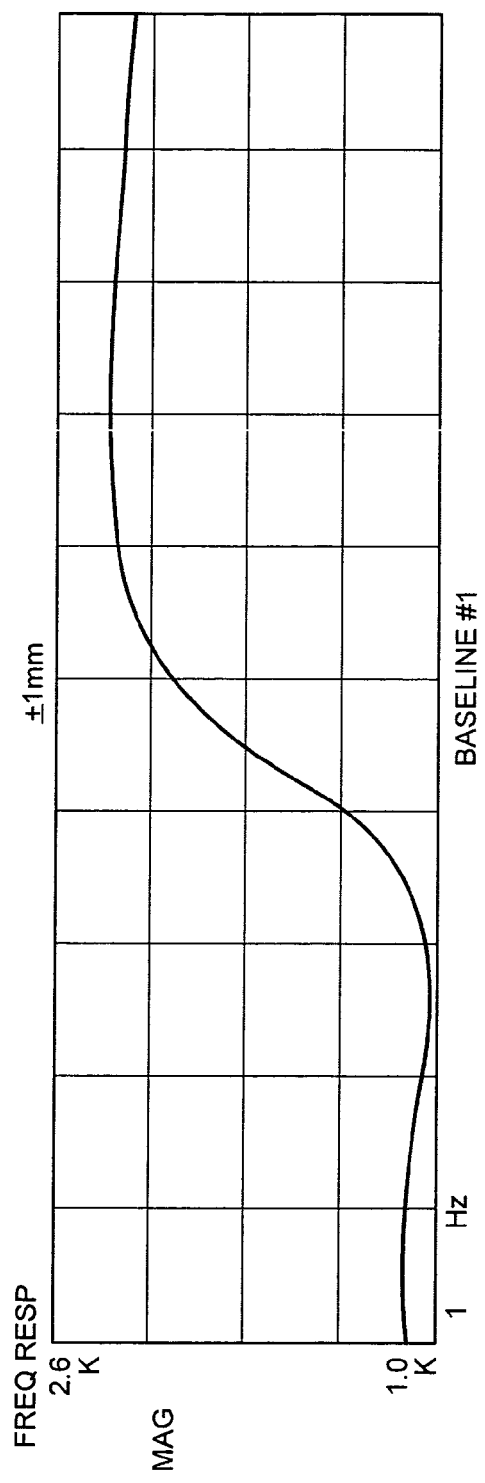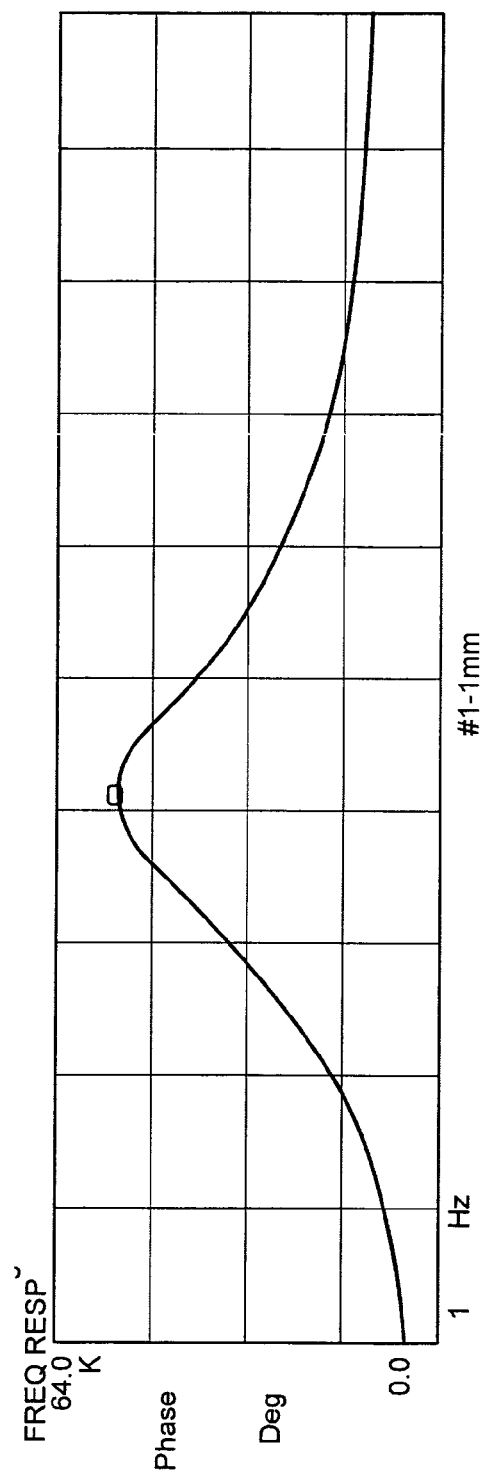
FIG. 9A
FIG. 9B

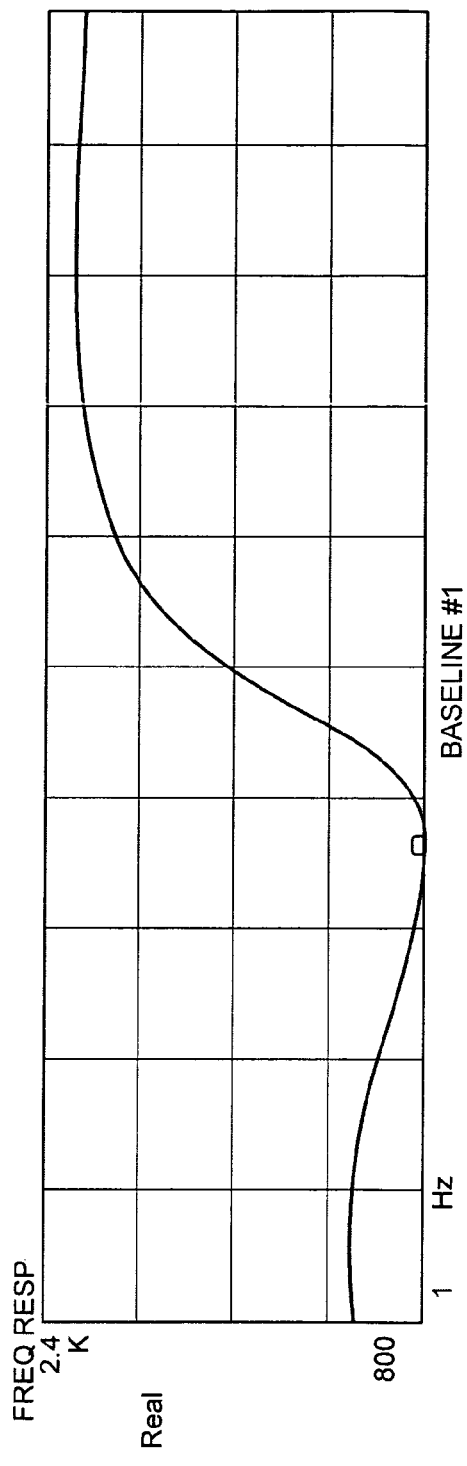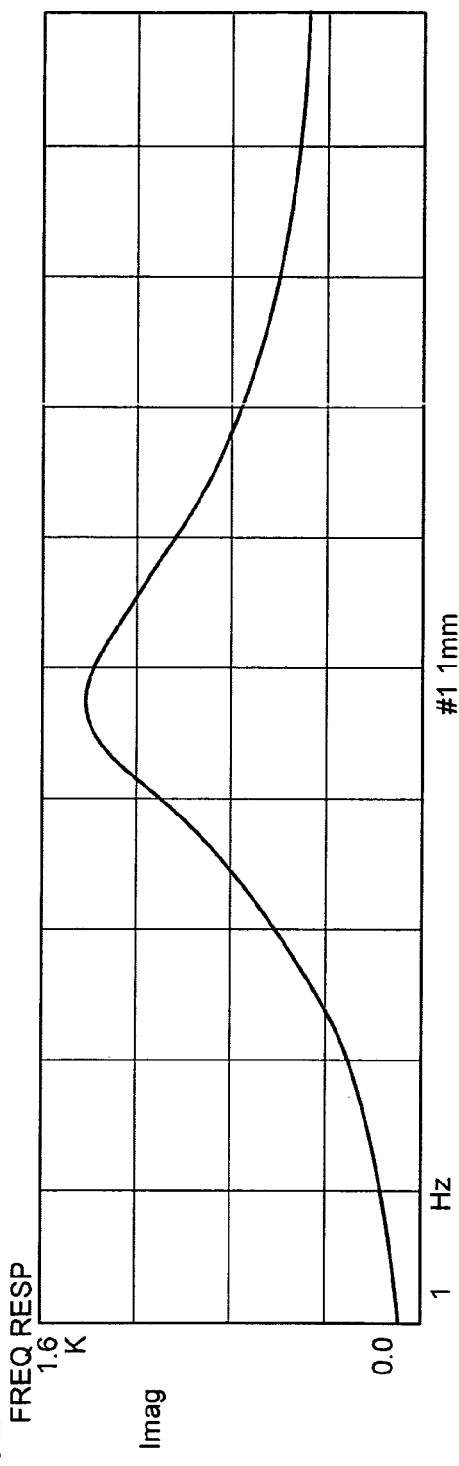
FIG. 10A
FIG. 10B

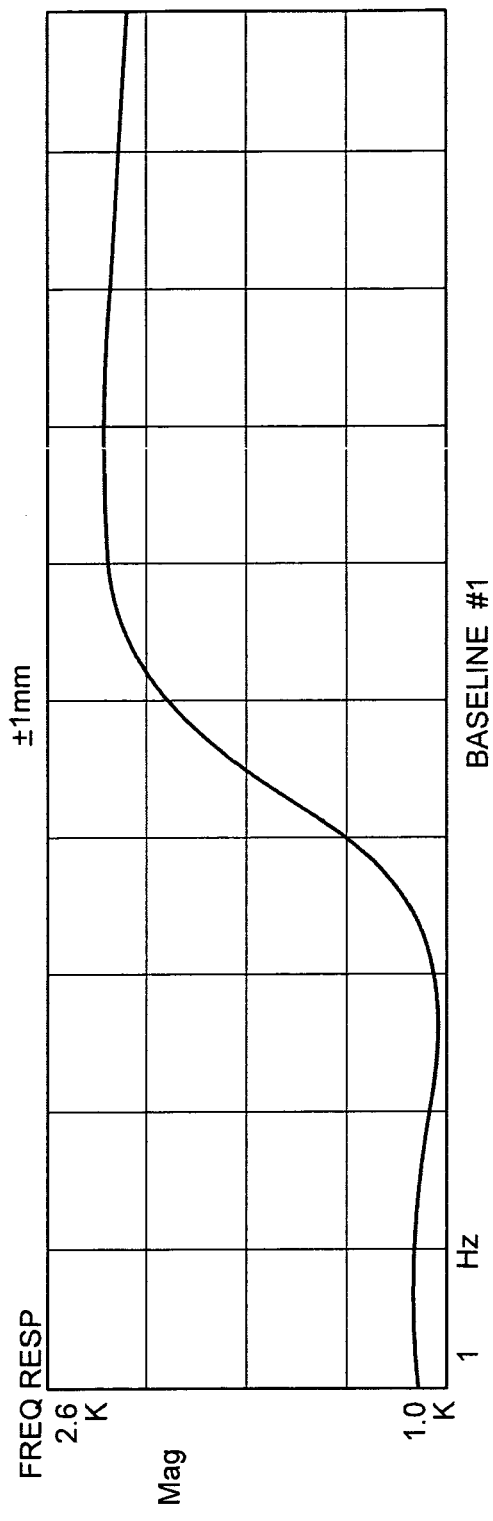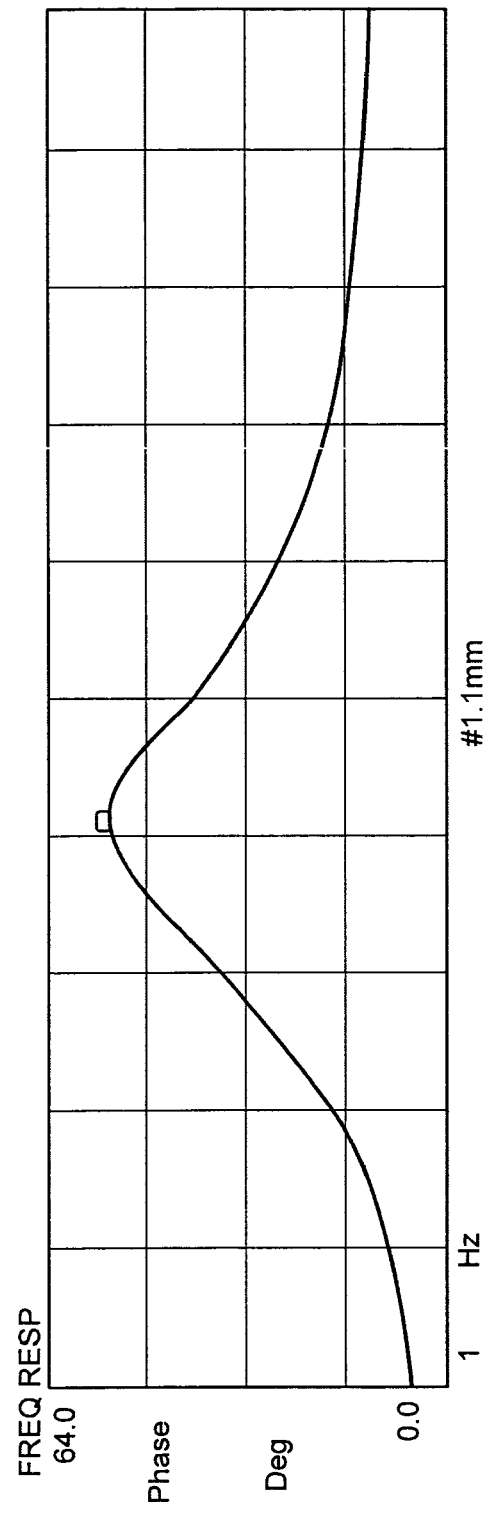
FIG. 13A
FIG. 13B

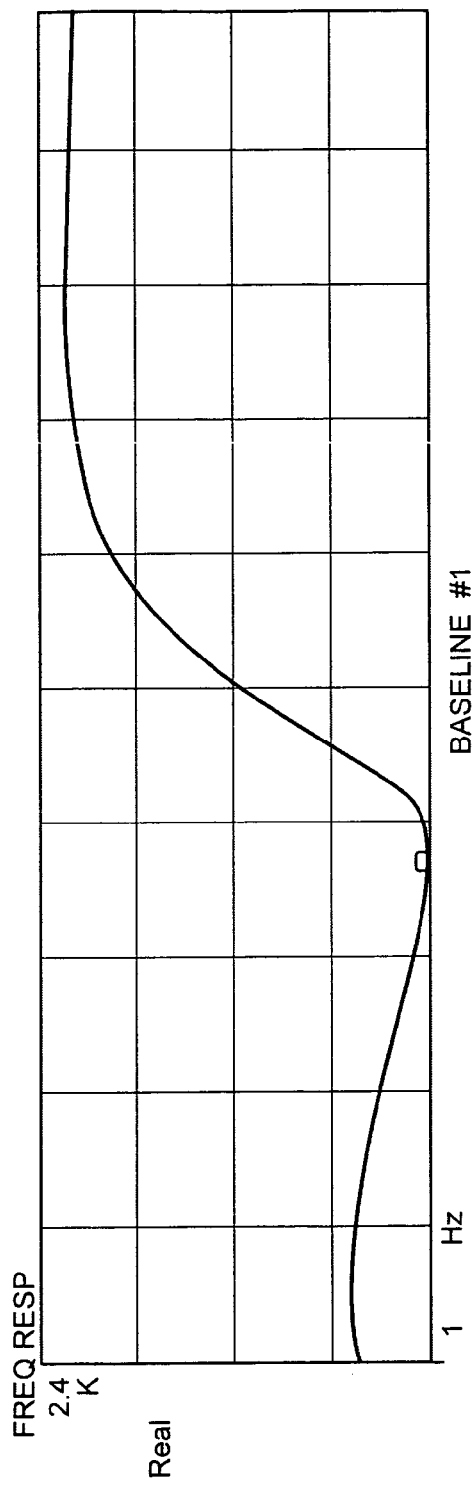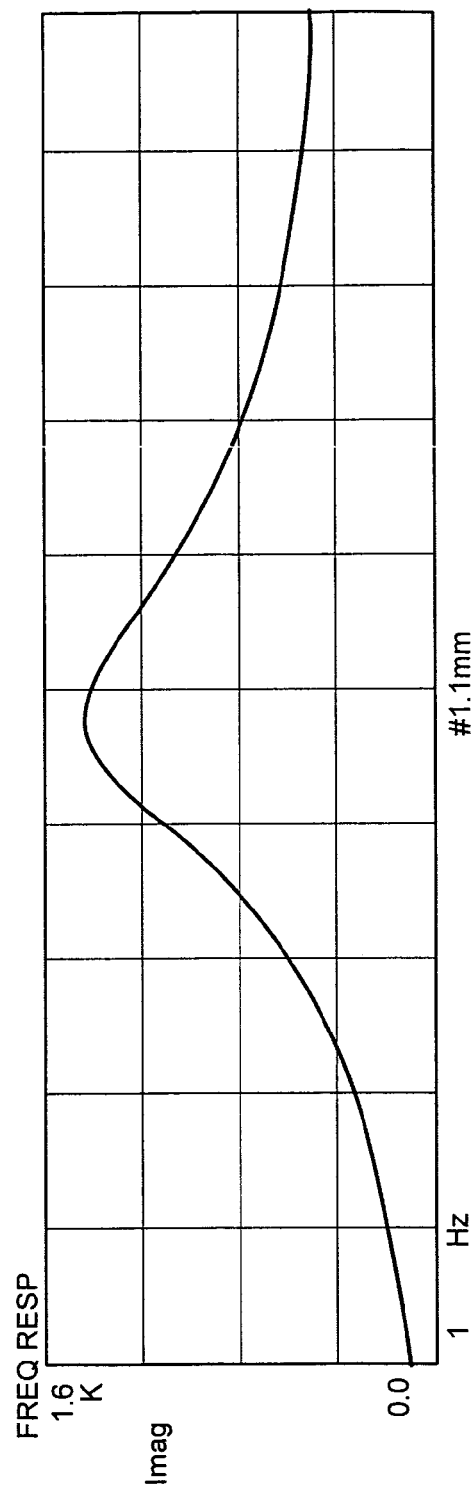
FIG. 14A
FIG. 14B

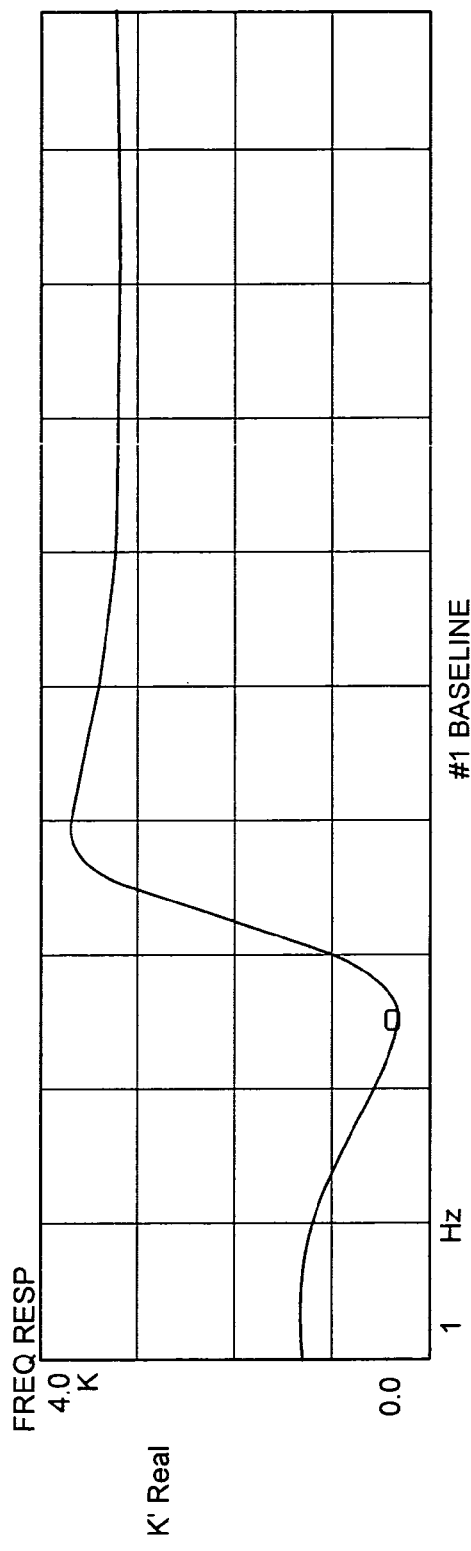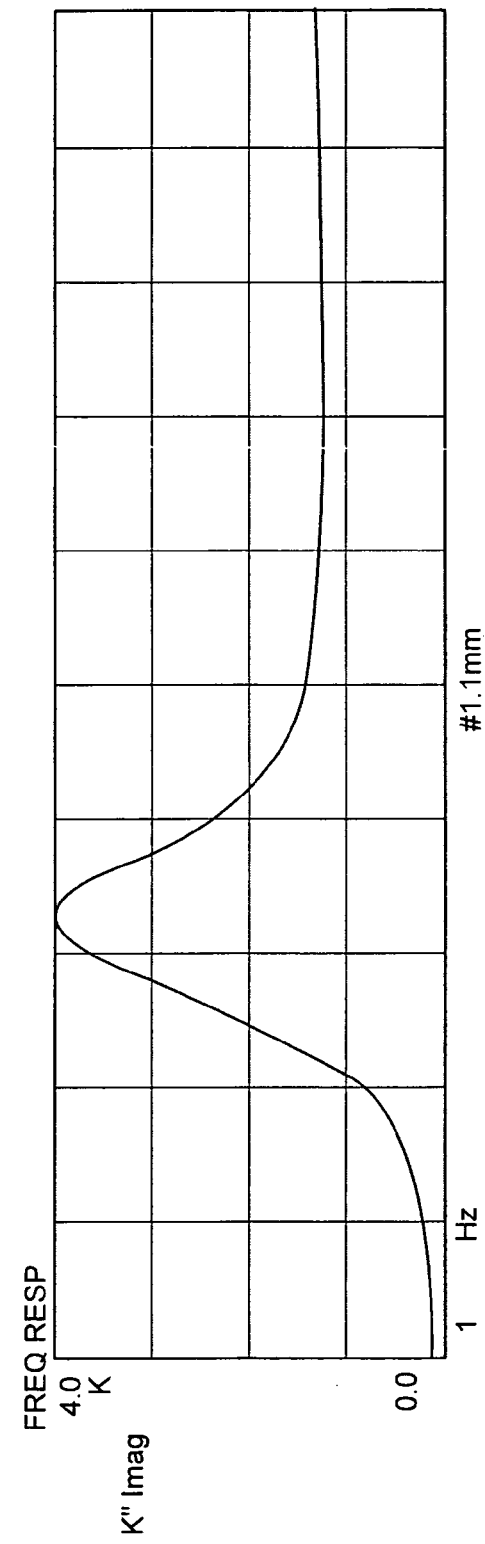
FIG. 16A
FIG. 16B

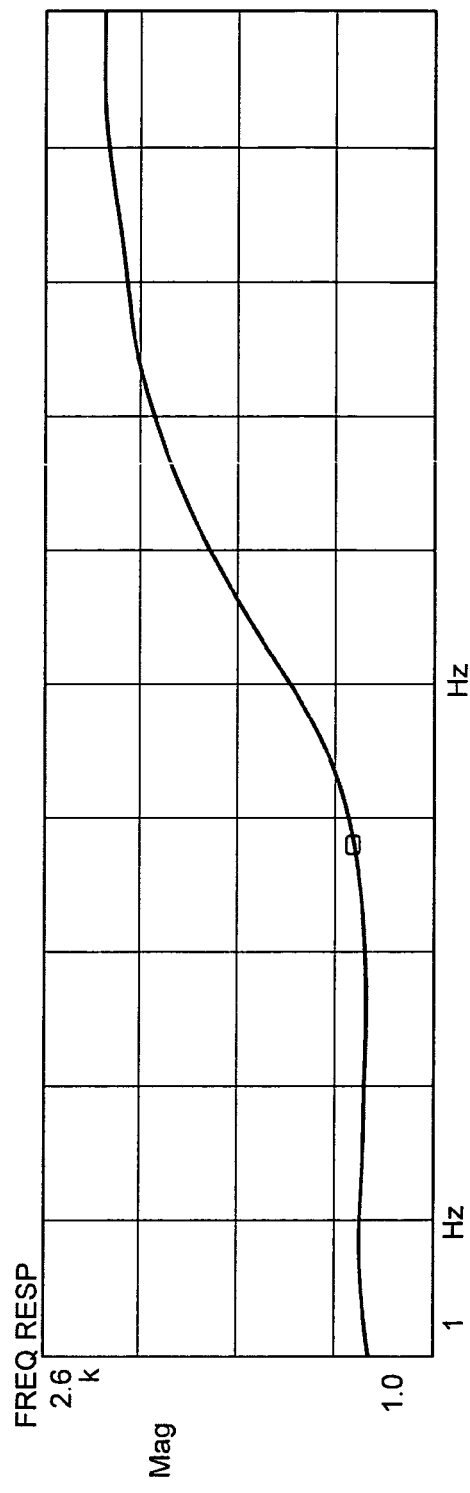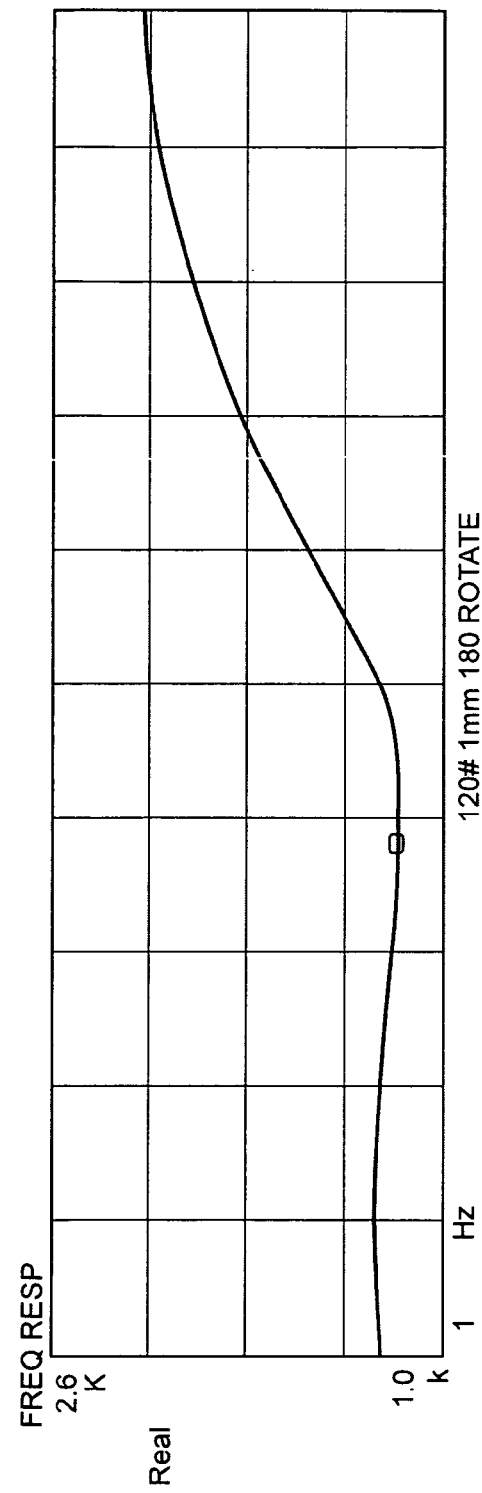
FIG. 29A
FIG. 29B

METHOD OF MAKING AN EQUIPMENT ENGINE MOUNTING SYSTEM

CROSS REFERENCE

This application claims the benefit of, and incorporates by reference, U.S. Provisional Patent Application No. 60/656,569 filed Feb. 25, 2005; U.S. Provisional Patent Application No. 60/659,802 filed Mar. 9, 2005; U.S. Provisional Patent Application No. 60/663,822 filed Mar. 21, 2005; and U.S. Provisional Patent Application No. 60/667,498 filed Apr. 1, 2005.

FIELD OF THE INVENTION

The present invention relates to a method/system for controlling problematic vibrations. More particularly the invention relates to an engine mounting system for controlling vibrations, particularly systems and methods for mounting devices having problematic vibrations, particularly problematic vibration engines.

BACKGROUND OF THE INVENTION

Engine vibrations are particularly troublesome in that they can cause fatigue and wear on the equipment that they are utilized with and the operators and people in contact with the equipment. In some equipment vibrations are particularly problematic in that they can damage the actual structure and components that make up the equipment in addition to the contents of the equipment.

There is a need for a system and method of accurately and economically controlling vibrations and mounting vibrating engines. There is a need for a system and method of accurately and economically controlling vibrations. There is a need for an economically feasible method of controlling vibrations in equipment with engines so that the vibrations are efficiently minimized. There is a need for a robust system of controlling vibrations in engine equipment so that the vibrations are efficiently controlled and minimized. There is a need for an economic method/system for mounting engines and controlling problematic vibrations.

SUMMARY OF THE INVENTION

The invention includes an equipment engine mounting system for mounting an equipment engine to an equipment frame. The equipment engine mounting system preferably includes a first engine mount disposed between the equipment engine and the equipment frame, the first engine mount including a first engine mount nonextensible inner member, the first engine mount nonextensible inner member having an outer bonding surface, the first engine mount including a first engine mount nonextensible outer member, the first engine mount nonextensible outer member having an inner bonding surface. Preferably the first engine mount includes an intermediate elastomer between the first engine mount nonextensible inner member and the first engine mount nonextensible outer member, the first engine mount intermediate elastomer bonded to the first engine mount nonextensible inner member outer bonding surface and the first engine mount nonextensible outer member inner bonding surface, the first engine mount intermediate elastomer, the first engine mount nonextensible inner member, and the first engine mount nonextensible outer member forming a liquid housing cavity, the liquid housing cavity containing a first variable volume liquid chamber proximate the first engine mount nonextensible inner member and a second variable volume liquid chamber, the second variable volume liquid chamber distal from the first engine mount nonextensible inner member. Preferably the first variable volume liquid chamber is segregated from the second variable volume liquid chamber by a nonextensible rigid liquid track member having a perimeter liquid track path, the first variable volume liquid chamber and the second variable volume liquid chamber filled with a mount liquid. The first variable volume liquid chamber is in liquid communication with the second variable volume liquid chamber through the outer perimeter liquid track path, wherein a movement of the first engine mount nonextensible inner member relative to the first engine mount nonextensible outer member plungers the mount liquid in the first variable volume liquid chamber. Preferably the equipment engine mounting system includes a second engine mount disposed between the equipment engine and the equipment frame, the second engine mount including a second engine mount nonextensible frameside member, the second engine mount nonextensible frameside member having an outer bonding surface, the second engine mount including a second engine mount nonextensible engineside member, the second engine mount nonextensible engineside member having an inner bonding surface, the second engine mount comprised a highly damped elastomer between the second engine mount nonextensible frameside member and the second engine mount nonextensible engineside member, the highly damped elastomer bonded to the second engine mount nonextensible frameside member outer bonding surface and the second engine mount nonextensible engineside member inner bonding surface. Preferably the highly damped elastomer has a tan delta of at least 0.2. Preferably the engine mounting system mounts inhibit a transmission of a vibration of the equipment engine to the equipment frame.

The invention includes an equipment engine mount for mounting an equipment engine to an equipment frame. The equipment engine mount includes an equipment engine mount nonextensible inner member, the equipment engine mount nonextensible inner member having an outer bonding surface, the equipment engine mount including a equipment engine mount nonextensible outer member, the equipment engine mount nonextensible outer member having an inner bonding surface, the equipment engine mount including an intermediate elastomer between the equipment engine mount nonextensible inner member and the equipment engine mount nonextensible outer member, the equipment engine mount intermediate elastomer bonded to the equipment engine mount nonextensible inner member outer bonding surface and the equipment engine mount nonextensible outer member inner bonding surface. Preferably the equipment engine mount intermediate elastomer, the equipment engine mount nonextensible inner member, and the equipment engine mount nonextensible outer member form a liquid housing cavity, the liquid housing cavity containing a first variable volume liquid chamber proximate the equipment engine mount nonextensible inner member and a second variable volume liquid chamber, the second variable volume liquid chamber distal from the equipment engine mount nonextensible inner member. Preferably the first variable volume liquid chamber is segregated from the second variable volume liquid chamber by a nonextensible liquid track member having an outer perimeter liquid track path, the first variable volume liquid chamber and the second variable volume liquid chamber filled with a mount liquid. Preferably the first variable volume liquid chamber is in liquid communication with the second variable volume liquid chamber only through the outer perimeter liquid track path, wherein a movement of the equipment engine mount nonextensible inner member relative to the equipment engine mount nonextensible outer member plungers the mount liquid in the equipment variable volume liquid chamber.

The invention includes an adjustable mount having a band notch frequency band for isolating a vibrating body. The mount includes an adjustable mount nonextensible inner member, the adjustable mount nonextensible inner member having an outer bonding surface. Preferably the adjustable mount includes an adjustable mount nonextensible outer member, the adjustable mount nonextensible outer member having an inner bonding surface. Preferably the adjustable mount includes an intermediate elastomer between the adjustable mount nonextensible inner member and the adjustable mount nonextensible outer member, the adjustable mount intermediate elastomer bonded to the adjustable mount nonextensible inner member outer bonding surface and the adjustable mount nonextensible outer member inner bonding surface, the adjustable mount intermediate elastomer, the adjustable mount nonextensible inner member, and the adjustable mount nonextensible outer member forming a liquid housing cavity. Preferably the liquid housing cavity contains a first variable volume liquid chamber proximate the adjustable mount nonextensible inner member and a second variable volume liquid chamber, the second variable volume liquid chamber distal from the adjustable mount nonextensible inner member. Preferably the first variable volume liquid chamber is segregated from the second variable volume liquid chamber by a nonextensible rigid adjustable liquid track member having an outer perimeter liquid track path, the adjustable liquid track member including a first variable volume liquid chamber top track piece and a second variable volume liquid chamber bottom track piece, the first variable volume liquid chamber top track piece and the second variable volume liquid chamber bottom track piece having corresponding periodic attachment point members. Preferably the top track piece and the bottom track piece are attached together with the periodic attachment point members with the liquid track path having a first path length. Preferably the top track piece is clockable relative to the bottom track piece in order to change the liquid track path length to a second track path length. Preferably the periodic attachment point members secure the second track path length. Preferably the first variable volume liquid chamber and the second variable volume liquid chamber are filled with a mount liquid, the first variable volume liquid chamber in liquid communication with the second variable volume liquid chamber through the outer perimeter liquid track path, wherein a movement of the adjustable mount nonextensible inner member relative to the adjustable mount nonextensible outer member plungers the mount liquid in the first variable volume liquid chamber.

The invention includes a method of making an engine mount for mounting an engine to a frame, the method including: providing an engine mount nonextensible inner member bonded with an intermediate elastomer to an engine mount nonextensible outer member, providing an engine mount flexible diaphragm, providing an engine mount nonextensible inertial liquid track member having a liquid track path, providing an engine mount housing, assembling the engine mount flexible diaphragm, the engine mount nonextensible inertial liquid track member, the engine mount housing, and the engine mount nonextensible inner member bonded with the intermediate elastomer to the engine mount nonextensible outer member to provide a liquid housing cavity containing a first variable volume liquid chamber proximate the engine mount nonextensible inner member and a second variable volume liquid chamber adjacent the mount flexible diaphragm, the second variable volume liquid chamber distal from the engine mount nonextensible inner member with the first variable volume liquid chamber segregated from the second variable volume liquid chamber by the nonextensible inertial liquid track member. The method includes filling the first variable volume liquid chamber and the second variable volume liquid chamber with a mount liquid, the first variable volume liquid chamber in liquid communication with the second variable volume liquid chamber through the liquid track path, wherein a movement of the engine mount nonextensible inner member relative to the engine mount nonextensible outer member plungers the mount liquid in the first variable volume liquid chamber.

The invention includes a method of making an equipment engine mounting system. The method includes providing a first equipment engine mount nonextensible inner member bonded with an intermediate elastomer to a first equipment engine mount nonextensible outer member. The method includes providing an equipment engine mount flexible diaphragm. The method includes providing an equipment engine mount nonextensible inertial liquid track member having a liquid track path. The method includes providing an equipment engine mount housing. The method includes assembling the equipment engine mount flexible diaphragm, the equipment engine mount nonextensible inertial liquid track member, the equipment engine mount housing, and the first equipment engine mount nonextensible inner member bonded with the intermediate elastomer to the first equipment engine mount nonextensible outer member to provide a liquid housing cavity containing a first variable volume liquid chamber proximate the equipment engine mount nonextensible inner member and a second variable volume liquid chamber adjacent the mount flexible diaphragm, with the second variable volume liquid chamber distal from the equipment engine mount nonextensible inner member with the first variable volume liquid chamber segregated from the second variable volume liquid chamber by the nonextensible inertial liquid track member. The method includes filling the first variable volume liquid chamber and the second variable volume liquid chamber with a mount liquid. Preferably assembling and filling provides the first variable volume liquid chamber in liquid communication with the second variable volume liquid chamber through the liquid track path to provide a first liquid engine mount. Preferably the method includes providing a second engine mount nonextensible frameside member, the second engine mount nonextensible frameside member having an outer bonding surface. The method includes providing a second engine mount nonextensible engineside member, the second engine mount nonextensible engineside member having an inner bonding surface. The method includes providing a second engine mount elastomer and mold bonding the second engine mount elastomer to the second engine mount nonextensible frameside member and the second engine mount nonextensible engineside member, with the second engine mount elastomer bonded to the second engine mount nonextensible frameside member outer bonding surface and the second engine mount nonextensible engineside member inner bonding surface to provide a second engine mount.

The invention includes a mounting system for mounting a vibrating source to a frame, the mounting system including a first mount disposed between the source and the frame. Preferably the first mount includes a first mount nonextensible inner member, the first mount nonextensible inner member having an outer bonding surface, the first mount including a first mount nonextensible outer member, the first mount nonextensible outer member having an inner bonding surface, the first mount comprised an intermediate elastomer between the first mount nonextensible inner member and the first mount nonextensible outer member, the first mount intermediate elastomer bonded to the first mount nonextensible inner member outer bonding surface and the first mount nonextensible outer member inner bonding surface. Preferably the first mount intermediate elastomer, the first mount nonextensible inner member, and the first mount nonextensible outer member form a liquid housing cavity, the liquid housing cavity containing a first variable volume liquid chamber proximate the first mount nonextensible inner member and a second variable volume liquid chamber, the second variable volume liquid chamber distal from the first mount nonextensible inner member, the first variable volume liquid chamber segregated from the second variable volume liquid chamber by a nonextensible rigid liquid track member having a perimeter liquid track path. Preferably the first variable volume liquid chamber and the second variable volume liquid chamber are filled with a mount liquid, the first variable volume liquid chamber in liquid communication with the second variable volume liquid chamber through the outer perimeter liquid track path, wherein a movement of the first mount nonextensible inner member relative to the first mount nonextensible outer member plungers the mount liquid in the first variable volume liquid chamber. Preferably the system includes a second mount disposed between the source and the frame, the second mount including a second mount nonextensible frameside member, the second mount nonextensible frameside member having an outer bonding surface, the second mount including a second mount nonextensible sourceside member, the second engine mount nonextensible sourceside member having an inner bonding surface, the second mount comprised a highly damped elastomer between the second mount nonextensible frameside member and the second mount nonextensible sourceside member, the highly damped elastomer bonded to the second mount nonextensible frameside member outer bonding surface and the second mount nonextensible sourceside member inner bonding surface. Preferably the highly damped elastomer has a tan delta of at least 0.2, with the mounting system inhibiting a transmission of a vibration of the source to the frame.

The invention includes an engine mount for mounting an engine to a frame. The engine mount including an engine mount nonextensible rigid nonelastomer metal inner member, the engine mount nonextensible inner member having an outer bonding surface, the engine mount including an engine mount nonextensible rigid nonelastomer metal outer member, the engine mount nonextensible outer member having an inner bonding surface. The engine mount includes an intermediate elastomer between the engine mount nonextensible inner member and the engine mount nonextensible outer member, the engine mount intermediate elastomer bonded to the engine mount nonextensible inner member outer bonding surface and the engine mount nonextensible outer member inner bonding surface, the engine mount intermediate elastomer, the engine mount nonextensible inner member, and the engine mount nonextensible outer member forming a liquid housing cavity. Preferably the liquid housing cavity contains a first variable volume liquid chamber proximate the engine mount nonextensible inner member and a second variable volume liquid chamber, the second variable volume liquid chamber distal from the engine mount nonextensible inner member, the first variable volume liquid chamber segregated from the second variable volume liquid chamber by a nonextensible rigid nonelastomer inertial liquid track member having an outer perimeter, the nonextensible rigid nonelastomer inertial liquid track member having an outer perimeter tuned liquid track path proximate the liquid track member outer perimeter and the engine mount nonextensible rigid nonelastomer metal outer member. Preferably the first variable volume liquid chamber and the second variable volume liquid chamber are filled with a mount liquid, the first variable volume liquid chamber in liquid communication with the second variable volume liquid chamber only through the outer perimeter liquid track path. Preferably a movement of the engine mount nonextensible inner member relative to the engine mount nonextensible outer member plungers the mount liquid in the variable volume liquid chamber and moves the mount liquid in the outer perimeter tuned liquid track path with the engine mount having a frequency notch band.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIGS. 9A-B show stiffness curve frequency notch band plots.

FIGS. 10A-B show stiffness curve frequency notch band plots.

FIGS. 13A-B show stiffness curve frequency notch band plots.

FIGS. 14A-B show stiffness curve frequency notch band plots.

FIGS. 16A-B show stiffness curve frequency notch band plots.

FIGS. 29A-B show stiffness curve frequency notch band plots.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

Figure 1:
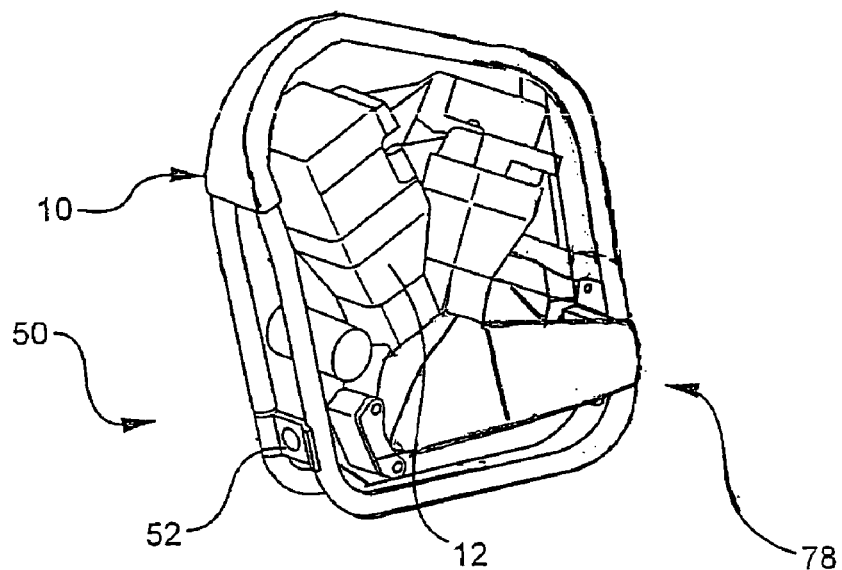
FIG. 1 shows an equipment engine mounting system mounting an engine to a frame to control vibrations.
Figure 2:
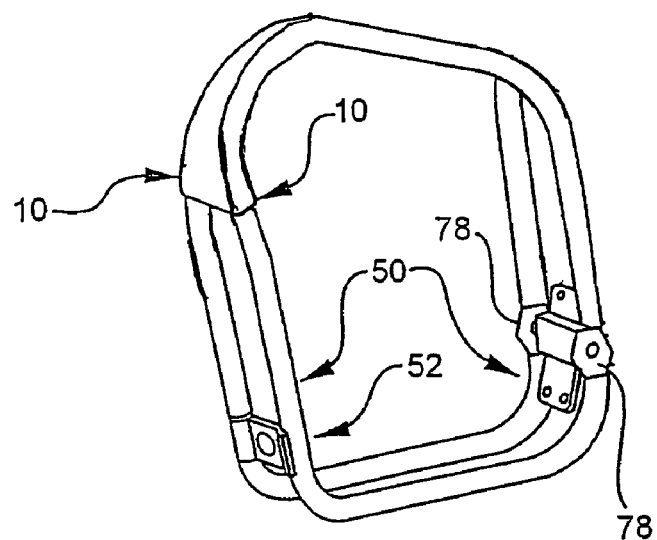
FIG. 2 shows the equipment engine mounting system and frame of FIG. 1 with the engine removed.

The invention includes an equipment engine mounting system for mounting an equipment engine to an equipment frame. FIGS. 1-2 show an equipment engine mounting system 50 for mounting an equipment engine 12 to equipment frame 10. Preferably the engine 12 is a less than three cylinder engine, most preferably a two cylinder engine. The equipment engine mounting system 50 is comprised of a first front lower engine mount 52 disposed between the equipment engine 12 and the equipment frame 10. Preferably the engine mount 52 is in front of the middle center of the engine. Preferably the engine mount 52 is below the middle center of the engine. The first engine mount 52 is comprised of a first engine mount nonextensible rigid nonelastomer metal inner member 54, the first engine mount nonextensible inner member 54 having an outer bonding surface 56. The first engine mount 50 is comprised of a first engine mount nonextensible rigid nonelastomer metal outer member 58, the first engine mount nonextensible outer member 58 having an inner bonding surface 60. The first engine mount 52 comprised an intermediate elastomer 62 between the first engine mount nonextensible inner member 54 and the first engine mount nonextensible outer member 58, the first engine mount intermediate elastomer 62 bonded to the first engine mount nonextensible inner member outer bonding surface 56 and the first engine mount nonextensible outer member inner bonding surface 60. The first engine mount intermediate elastomer 62, the first engine mount nonextensible inner member 54, and the first engine mount nonextensible outer member 58 forming a liquid housing cavity 64. The liquid housing cavity 64 containing a first variable volume liquid chamber 66 proximate the first engine mount nonextensible inner member 54 and a second variable volume liquid chamber 68, the second variable volume liquid chamber 68 distal from the first engine mount nonextensible inner member 54. The first variable volume liquid chamber 66 segregated from the second variable volume liquid chamber 68 by a nonextensible rigid inertial liquid track member 70 having a outer perimeter tuned liquid track path 72 proximate the outer perimeter of the track member 70. Preferably the outer perimeter tuned liquid track path 72 formed by the track member perimeter groove 74 and the outer member with the bonded elastomer. Preferably the track member perimeter groove 74 is a curved circular outer perimeter groove, preferably with a D shaped flat-curved cross section with the flat side preferably on the outer member side. The first variable volume liquid chamber 66 and the second variable volume liquid chamber 68 contain and are filled with a mount liquid 76 with the first variable volume liquid chamber 66 in liquid communication with the second variable volume liquid chamber 68 through the outer perimeter liquid track path 72, wherein a movement of the first engine mount nonextensible inner member 54 relative to the first engine mount nonextensible outer member 58 plungers the mount liquid 76 in the first variable volume liquid chamber 66. Preferably the movement of the equipment engine mount nonextensible inner member 54 relative to the equipment engine mount nonextensible outer member 58 plungers the mount liquid 76 in the equipment variable volume liquid chamber 66 with the mount 52 having a frequency notch band centered about a center frequency X Hz (X±5 Hz). Preferably the mount 52 has a frequency notch band in the range from W (X−5) Hz to Y (X+5) Hz. Preferably the frequency notch band is centered about X with a band width of about 10 Hz.

Figure 17A:
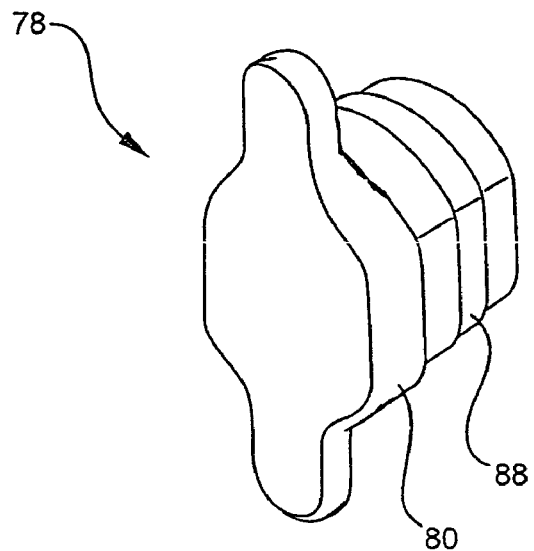
FIGS. 17A-B show an engine mount.
Figure 17B:
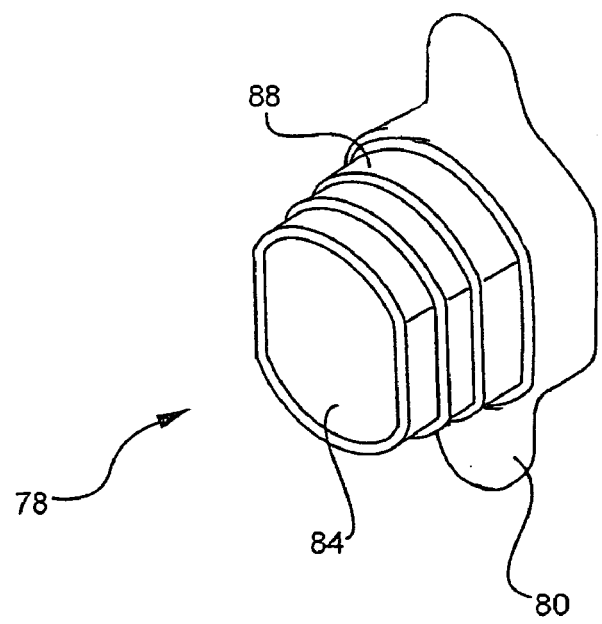
Figure 18A:
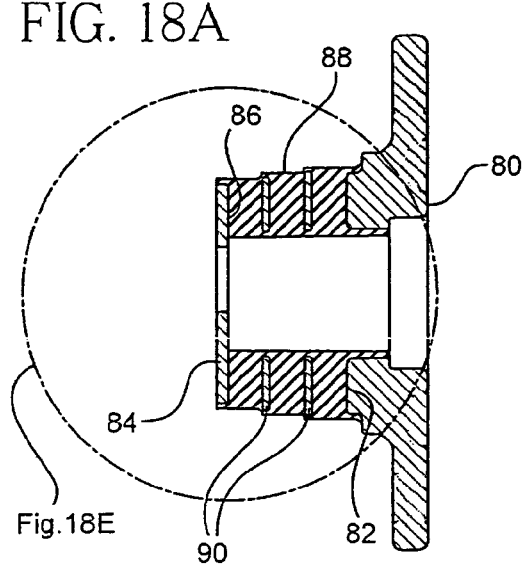
FIGS. 18A-F show views of an engine mount.
Figure 18B:
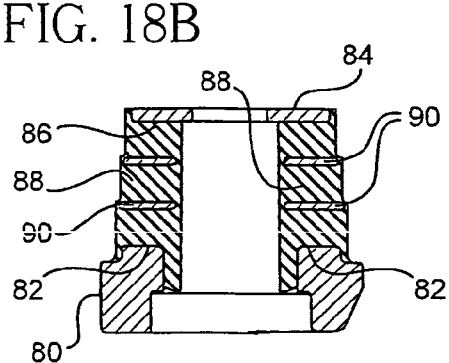
Figure 18C:
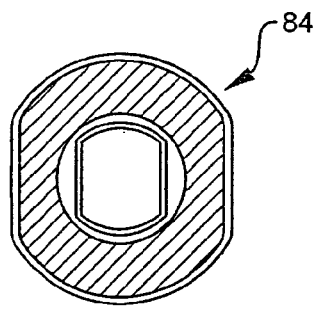
Figure 18D:
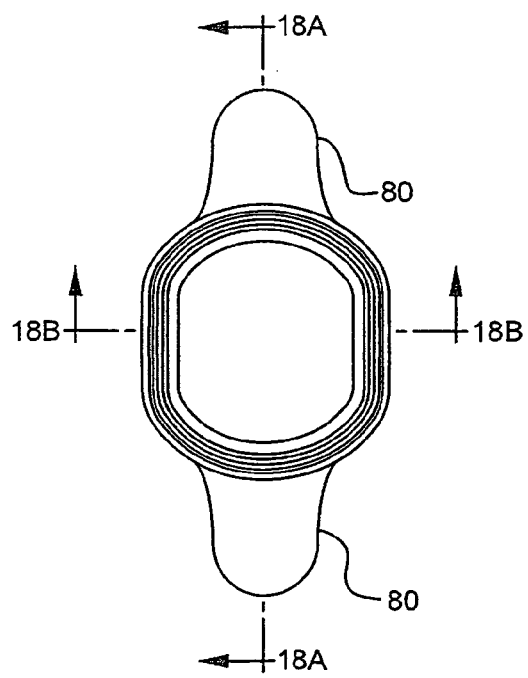
Figure 18E:
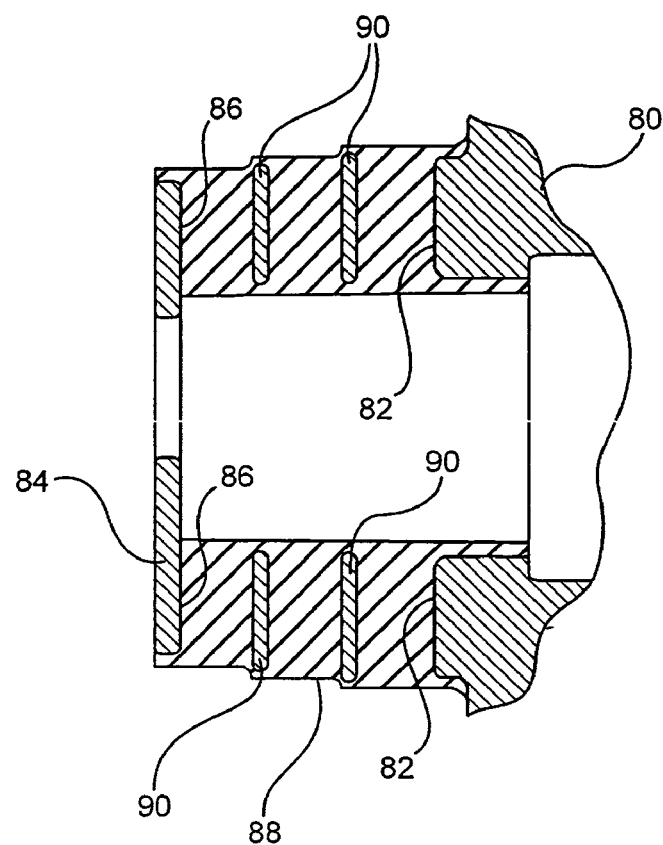
Figure 18F:
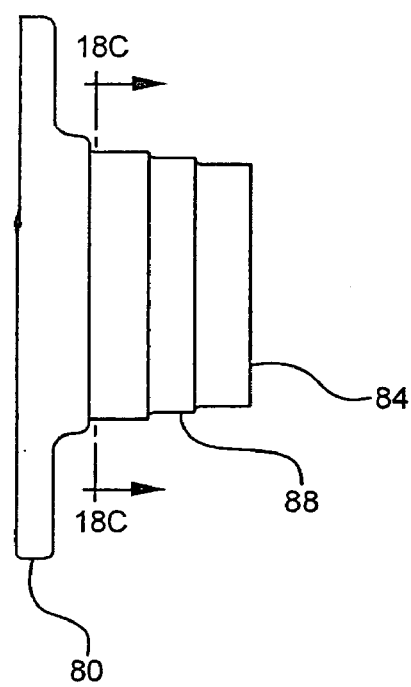

As shown in FIGS. 1-2 the equipment engine-mounting system 50 is comprised of a second rear lower engine mounts 78 disposed between the equipment engine 12 and the equipment frame 10. Preferably the engine mounts 78 are to the rear of the middle center of the engine. Preferably the engine mount 78 are below the middle center of the engine. As shown in FIGS. 17-18 the second engine mount 78 is comprised of a second engine mount nonextensible rigid nonelastomer metal frameside member 80. The second engine mount nonextensible frameside member 80 having an outer bonding surface 82. The second engine mount 78 comprised of a second engine mount nonextensible rigid nonelastomer metal engineside member 84, the second engine mount nonextensible engineside member 84 having an inner bonding surface 86. The second engine mount 78 is comprised a highly damped elastomer 88 between the second engine mount nonextensible frameside member 80 and the second engine mount nonextensible engineside member 84. The highly damped elastomer 88 is bonded to the second engine mount nonextensible frameside member outer bonding surface 82 and the second engine mount nonextensible engineside member inner bonding surface 86. The highly damped elastomer preferably having a tan delta of at least 0.2 (with the tan delta of the elastomer being the damping stiffness/elastic stiffness (K"/K')).

As shown in FIG. 2 the equipment engine mounting system 50 preferably is comprised of a third rear lower engine mount 78 disposed between the equipment engine 12 and the equipment frame 10. As with the second engine mount, preferably the third engine mount 78 is to the rear of the middle center of the engine. Preferably the third engine mount 78 is below the middle center of the engine. The third engine mount 78 is comprised of a third engine mount nonextensible rigid nonelastomer metal frameside member 80, the third engine mount nonextensible frameside member 80 having an outer bonding surface 82. The third engine mount includes a third engine mount nonextensible engineside member 84, the third engine mount nonextensible engineside member 84 having an inner bonding surface 86. The third engine mount includes the highly damped elastomer 88 between the third engine mount nonextensible frameside member 80 and the third engine mount nonextensible engineside member 84. The highly damped elastomer 88 is bonded to the third engine mount nonextensible frameside member outer bonding surface 82 and the third engine mount nonextensible engineside member inner bonding surface 86, with the highly damped elastomer 88 having a tan delta of at least 0.2. As shown in FIG. 2 preferably the third mount 78 is proximate the second mount 78. Preferably the second and third mounts nonextensible are left and right hand mirror image pairs.

Figure 19:
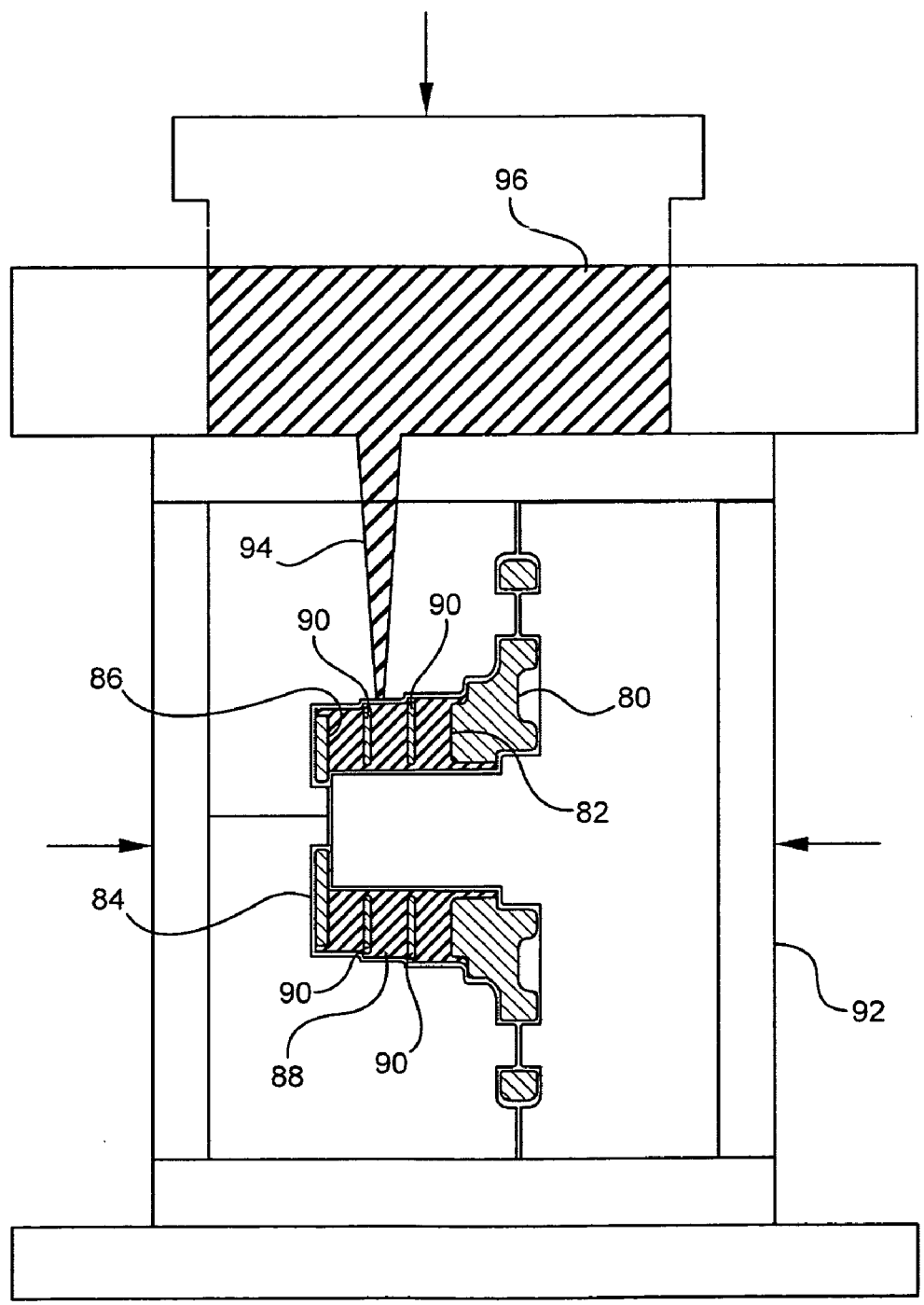
FIG. 19 shows a method of making an engine mount.

Preferably the second and third mounts 78 include at least one nonextensible rigid nonelastomer metal shim 90 bonded in the elastomer 88. Preferably two nonextensible rigid nonelastomer metal shims are bonded in the elastomer 88 between the engine mount nonextensible frameside member 80 and the third engine mount nonextensible engineside member. As shown in FIG. 19 the elastomer 88, the shims 90, nonextensible rigid nonelastomer metal frameside member 80, and the nonextensible engineside member 84, of the rear mount 78 are mold bonded in a mold 92. Preferably the elastomer 88 is mold bonded to the nonextensible rigid nonelastomer metal members 80 and 84 in a mold 92 such as shown in FIG. 19. Preferably the engine mount elastomer component 88 is mold bonded to the mount nonextensible member 80 and the mount nonextensible member 84 in an elastomer press mold 92, preferably with a rubber to metal bonding adhesive ensuring the bonding of the elastomer 88 to the metal outer bonding surfaces 82 and 86. Preferably the elastomer 88 is a mold bonded elastomeric member with the elastomer bonded to the rigid nonextensible member 80 and the nonextensible member 84 during the molding of the elastomer to the rigid metal nonextensible members with a rubber to metal bonding agent, preferably a rubber to metal bonding adhesive such as the Lord Chemlok rubber to metal bonding system, in the elastomer press mold 92 that accepts the rigid metal nonextensible members such as shown in FIG. 19. Preferably the method of making the engine mount 78 includes providing an elastomeric element mold 92 for receiving the nonelastomeric rigid metal nonextensible members, providing an elastomer 88, and molding the elastomer 88 to the nonelastomeric metal nonextensible members inside the mold 88. Preferably the elastomer 88 is comprised of a natural rubber elastomer. Most preferably the elastomer is comprised of an ethylene acrylic elastomer, preferably a Vamac ethylene/acrylic elastomer. In an embodiment such as shown in FIG. 19 molding in the mold includes providing the elastomer 88 as an elastomer transfer stock 96, and transferring the elastomer transfer stock 96 under a pressure into the mold 92, such as through a sprue 94 with the mold 92 comprising close fitting steel metal pieces pressed in place, and vulcanizing curing the elastomer 88 inside the mold 92 under a molding pressure, preferably a molding pressure of at least 300 psi, preferably at least 500 psi.

Preferably the engine mounting system mounts 50 inhibits a transmission of an idle vibration of the equipment engine 12 to the equipment frame 10.

Preferably the first engine mount nonextensible inner member 54 includes an engine mounting attachment stud 55, preferably with the first engine mount nonextensible inner member 54 mounted with the equipment engine 12 on the engineside 53 of the first mount 52. Preferably the engine mounting attachment stud 55 is on the distal end of the inner member 54 from the liquid chambers 66 and 68, preferably with the engine 12 attached at an axial end of the first mount 52.

Preferably the first engine mount nonextensible outer member 58 includes a frame interfacing attachment flange 59. Preferably the first engine mount nonextensible outer member 58 is mounted with the equipment frame 10, on the frameside 61 of the first mount 52. Preferably the frame interfacing attachment flange 59 is proximate the first liquid chamber 66, preferably with the frame 10 attached proximate the axial middle of the mount 52 between the engine mount end 46 and the distal opposite end 48.

Figure 5:
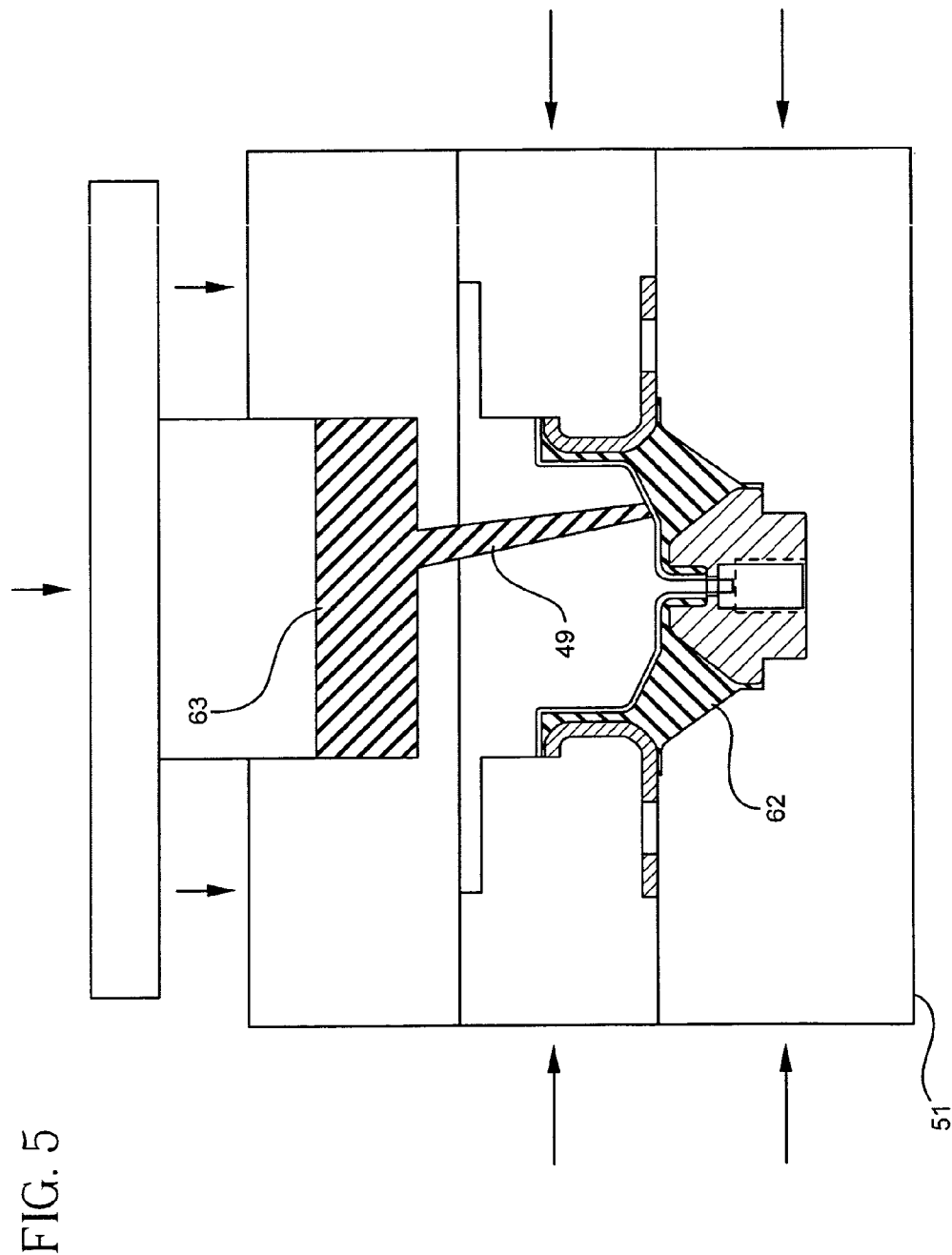
FIG. 5 shows a method of making a liquid mount.
Figure 6A:
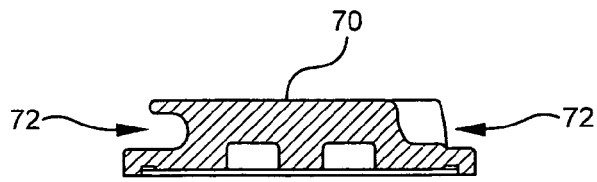
FIGS. 6A-G show views of a liquid track member component.
Figure 6B:
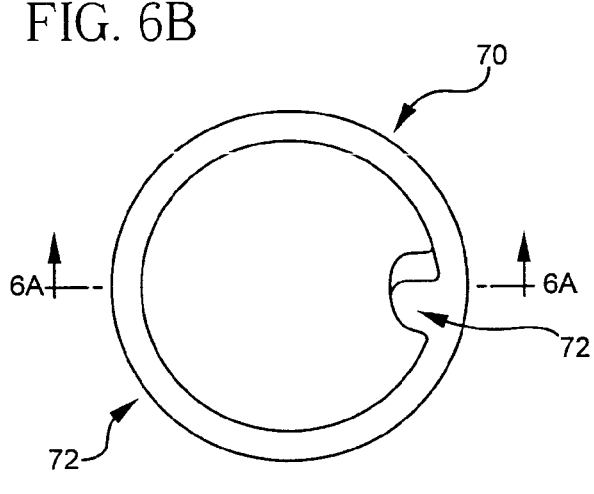
Figure 6C:
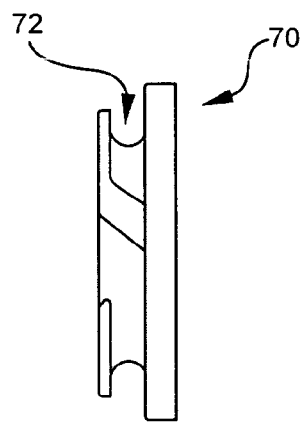
Figure 6D:
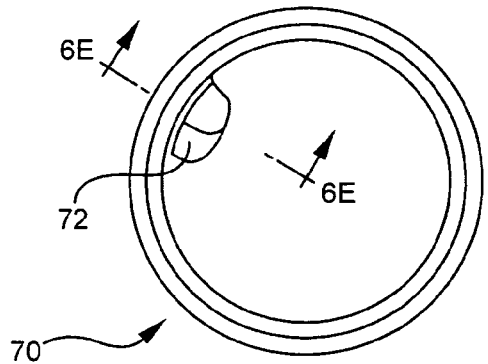
Figure 6E:
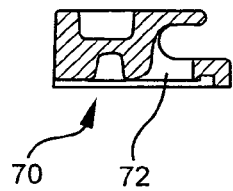
Figure 6F:
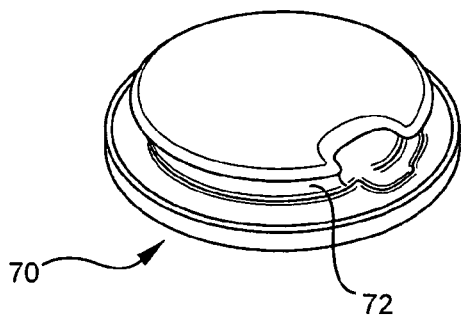
Figure 6G:
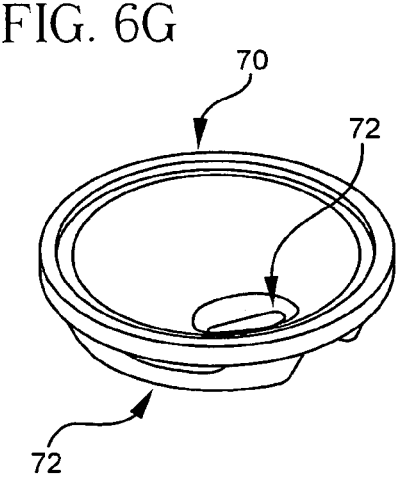

Preferably the first engine mount intermediate elastomer 62 is comprised of a lightly damped elastomer having a tan delta less than 0.2 (damping stiffness/elastic stiffness, (K"/K')). Preferably the mount liquid 76 is comprised of a glycol, preferably comprised of an ethylene glycol, or a propylene glycol, and most preferably a mixture of ethylene glycol and propylene glycol. Preferably the mount liquid 76 has a viscosity less than 100 centipoises, preferably less than 50 centipoises, and most preferably less than 30 centipoises. In a preferred embodiment the mount liquid viscosity is about 22 (±5) centipoises at 75 degrees F., preferably with the liquid having a density of about 0.0395 lbs per inch cubed. Preferably the elastomer 62 is mold bonded to the nonextensible rigid nonelastomer metal members 54 and 58 in a mold 51 such as shown in FIG. 5. Preferably the first engine mount intermediate elastomer component 62 is mold bonded to the first engine mount nonextensible inner member 54 and the first engine mount nonextensible outer member 58 in an elastomer press mold 51, preferably with a rubber to metal bonding adhesive ensuring the bonding of the elastomer 62 to the metal outer bonding surfaces 56 and 60. Preferably the first engine mount intermediate elastomer 62 is a mold bonded elastomeric member with the elastomer bonded to the rigid first engine mount nonextensible inner member and the first engine mount nonextensible outer member during the molding of the elastomer to the rigid metal nonextensible members with a rubber to metal bonding agent, preferably a rubber to metal bonding adhesive such as the Lord Chemlok rubber to metal bonding system, in an elastomer press mold 51 that accepts the rigid metal nonextensible members such as shown in FIG. 5. Preferably the method of making the engine mount 52 includes providing an elastomeric element mold 51 for receiving the nonelastomeric rigid metal nonextensible members, providing an elastomer 62, and molding the elastomer 62 to the nonelastomeric metal nonextensible members inside the mold 51. Preferably the elastomer 62 is comprised of a natural rubber elastomer. In an embodiment such as shown in FIG. 5 molding in the mold includes providing the elastomer 62 as an elastomer transfer stock 63, and transferring the elastomer transfer stock 63 under a pressure into the mold 51, such as through a sprue 49 with the mold 51 comprising close fitting steel metal pieces pressed in place, and vulcanizing curing the elastomer 62 inside the mold 51 under a molding pressure, preferably a molding pressure of at least 300 psi, preferably at least 500 psi.

Figure 4A:
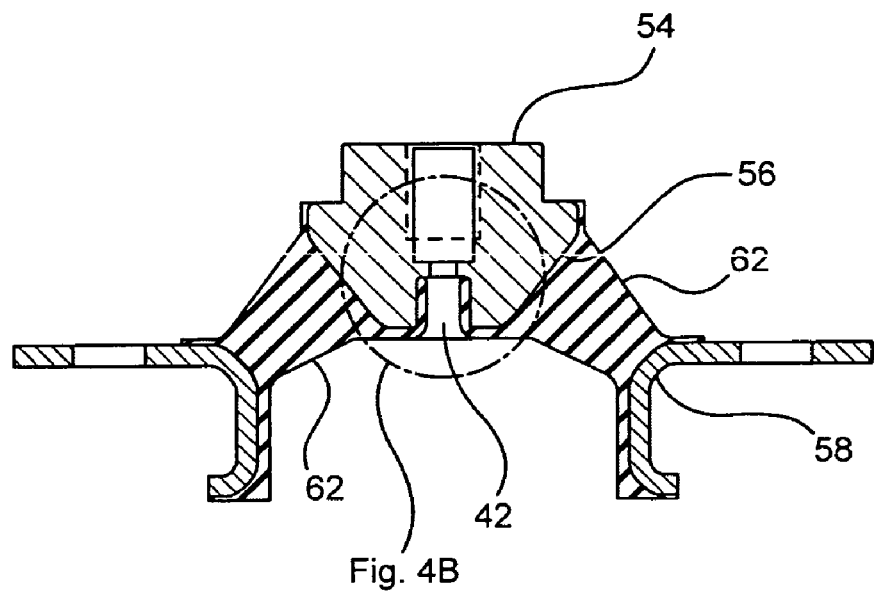
FIGS. 4A-B show components of a liquid mount.
Figure 4B:
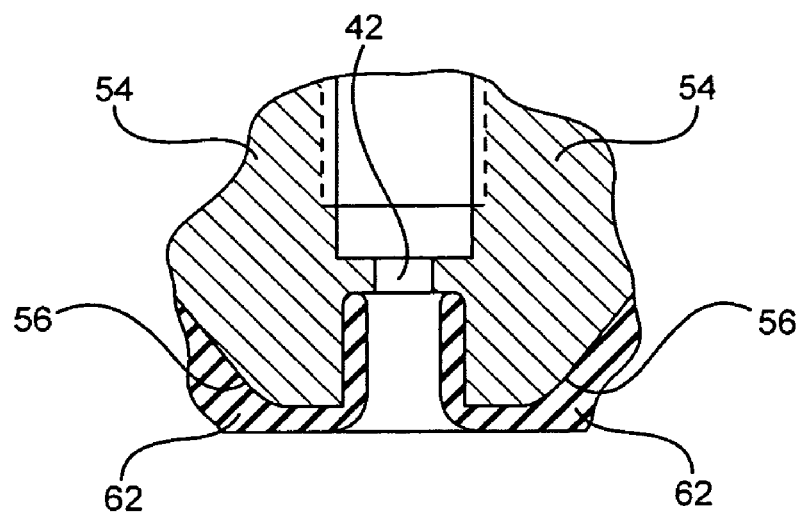

Preferably the first engine mount nonextensible inner member 54 defines a liquid fill passage 42, preferably the first engine mount nonextensible inner member outer bonding surface 56 extends into the liquid passage 42 with elastomer 62 bonded to this extending liquid passage outer bonding surface such as shown in FIGS. 4A-B. Preferably the mount liquid 76 filling the mount chambers 66 and 68 is disposed into the mount 52 through the first engine mount nonextensible inner member liquid fill passage 42, then the passage 42 is plugged, preferably with the plug rivet 40 that engages both the metal surfaces of the inner member 54 and the elastomer 62 in the liquid passage 42, preferably with rivet 40 then covered by the engine mounting attachment stud 55 inserted into the inner member 54, preferably with the end of the bonded elastomer/metal interface of passage 42 adjacent the rivet plug 40 and not adjacent the liquid 76 that fills the chambers.

Preferably the invention includes the equipment engine mount 52 for mounting an equipment engine to an equipment frame. The equipment engine mount 52 is preferably comprised of an equipment engine mount nonextensible rigid nonelastomer metal inner member 54, the equipment engine mount nonextensible inner member having an outer bonding surface 56. The equipment engine mount 52 is comprised of an equipment engine mount nonextensible rigid nonelastomer metal outer member 58, the equipment engine mount nonextensible outer member 58 having an inner bonding surface 60. The equipment engine mount comprised an intermediate elastomer 62 between the equipment engine mount nonextensible inner member and the equipment engine mount nonextensible outer member, the equipment engine mount intermediate elastomer bonded to the equipment engine mount nonextensible inner member outer bonding surface and the equipment engine mount nonextensible outer member inner bonding surface. The equipment engine mount intermediate elastomer, the equipment engine mount nonextensible inner member, and the equipment engine mount nonextensible outer member form a liquid housing cavity 64, the liquid housing cavity containing a first variable volume liquid chamber 66 proximate the equipment engine mount nonextensible inner member and a second variable volume liquid chamber 68, the second variable volume liquid chamber 68 distal from the equipment engine mount nonextensible inner member 54. The first variable volume liquid chamber 66 is segregated from the second variable volume liquid chamber 68 by a nonextensible rigid inertial liquid track member 70 having an outer perimeter tuned liquid track path 72, preferably proximate its outer perimeter. Preferably the track 72 is formed by the track member perimeter groove 74 and the outer member 58. In a preferred embodiment the liquid track member 70 is formed from a polymeric material, preferably a plastic material, and most preferably a nylon material. The first variable volume liquid chamber and the second variable volume liquid chamber contain and are filled with a mount liquid 76, with the first variable volume liquid chamber in liquid communication with the second variable volume liquid chamber through the outer perimeter liquid track path 72, wherein a movement of the equipment engine mount nonextensible inner member 54 relative to the equipment engine mount nonextensible outer member 58 plungers the mount liquid 76 in the equipment variable volume liquid chamber 66. Preferably the mount 52 has a frequency notch band centered about a center frequency X Hz (X±5 Hz). Preferably the mount 52 has a frequency notch band in the range from W (X−5) Hz to Y (X+5) Hz. Preferably the frequency notch band is centered about X with a band width of about 10 Hz.

FIGS. 9-16 show stiffness curves for the mount 52. The curves give K*, phase angle, K', and K" for the mount 52 at ±0.1 mm and ±1 mm.

Preferably the first engine mount nonextensible inner member 54 includes an engine mounting attachment stud 55, preferably with the first engine mount nonextensible inner member 54 mounted with the equipment engine 12 on the engineside 53 of the first mount 52. Preferably the engine mounting attachment stud 55 is on the distal end of the inner member 54 from the liquid chambers 66 and 68, preferably with the engine 12 attached at an axial end of mount of the first mount 52.

Preferably the first engine mount nonextensible outer member 58 includes a frame interfacing attachment flange 59. Preferably the first engine mount nonextensible outer member 58 is mounted with the equipment frame 10, on the frameside 61 of the first mount 52. Preferably the frame interfacing attachment flange 59 is proximate the first liquid chamber 66, preferably with the frame 10 attached proximate the axial middle of the mount 52 between the engine mount end 46 and the distal opposite end 48.

Preferably the first engine mount intermediate elastomer 62 is comprised of a lightly damped elastomer having a tan delta less than 0.2 [tan delta of the elastomer is the damping stiffness/elastic stiffness (K"/K')]. Preferably the mount liquid 76 is comprised of a glycol, preferably comprised of an ethylene glycol, or a propylene glycol, and most preferably a mixture of ethylene glycol and propylene glycol. Preferably the mount liquid 76 has a viscosity less than 100 centipoises, preferably less than 50 centipoises, and most preferably less than 30 centipoises. In a preferred embodiment the mount liquid viscosity is about 22 (±5) centipoises at 75 degrees F., preferably with the liquid having a density of about 0.0395 lbs per inch cubed. Preferably the elastomer 62 is mold bonded to the nonextensible rigid nonelastomer metal members 54 and 58 in a mold 51 such as shown in FIG. 5. Preferably the first engine mount intermediate elastomer component 62 is mold bonded to the first engine mount nonextensible inner member 54 and the first engine mount nonextensible outer member 58 in an elastomer press mold 51, preferably with a rubber to metal bonding adhesive ensuring the bonding of the elastomer 62 to the metal outer bonding surfaces 56 and 60. Preferably the first engine mount intermediate elastomer 62 is a mold bonded elastomeric member with the elastomer bonded to the rigid first engine mount nonextensible inner member and the first engine mount nonextensible outer member during the molding of the elastomer to the rigid metal nonextensible members with a rubber to metal bonding agent, preferably a rubber to metal bonding adhesive such as the Lord Chemlok rubber to metal bonding system, in an elastomer press mold 51 that accepts the rigid metal nonextensible members such as shown in FIG. 5. Preferably the method of making the engine mount 52 includes providing an elastomeric element mold 51 for receiving the nonelastomeric rigid metal nonextensible members, providing an elastomer 62, and molding the elastomer 62 to the nonelastomeric metal nonextensible members inside the mold 51. Preferably the elastomer 62 is comprised of a natural rubber elastomer. In an embodiment such as shown in FIG. 5 molding in the mold includes providing the elastomer 62 as an elastomer transfer stock 63, and transferring the elastomer transfer stock 63 under a pressure into the mold 51, such as through a sprue 49 with the mold 51 comprising close fitting steel metal pieces pressed in place, and vulcanizing curing the elastomer 62 inside the mold 51 under a molding pressure, preferably a molding pressure of at least 300 psi, preferably at least 500 psi. Preferably the first engine mount nonextensible inner member 54 defines a liquid fill passage 42, preferably the first engine mount nonextensible inner member outer bonding surface 56 extends into the liquid passage 42 with elastomer 62 bonded to this extending liquid passage outer bonding surface such as shown in FIGS. 4A-B. Preferably the mount liquid 76 filling the mount chambers 66 and 68 is disposed into the mount 52 through the first engine mount nonextensible inner member liquid fill passage 42, then the passage 42 is plugged, preferably with the plug rivet 40 that engages both the metal surfaces of the inner member 54 and the elastomer 62 in the liquid passage 42, preferably with rivet 40 then covered by the engine mounting attachment stud 55 inserted into the inner member 54, preferably with the end of the bonded elastomer/metal interface of passage 42 adjacent the rivet plug 40 and not adjacent the liquid 76 that fills the chambers.

Figure 20:
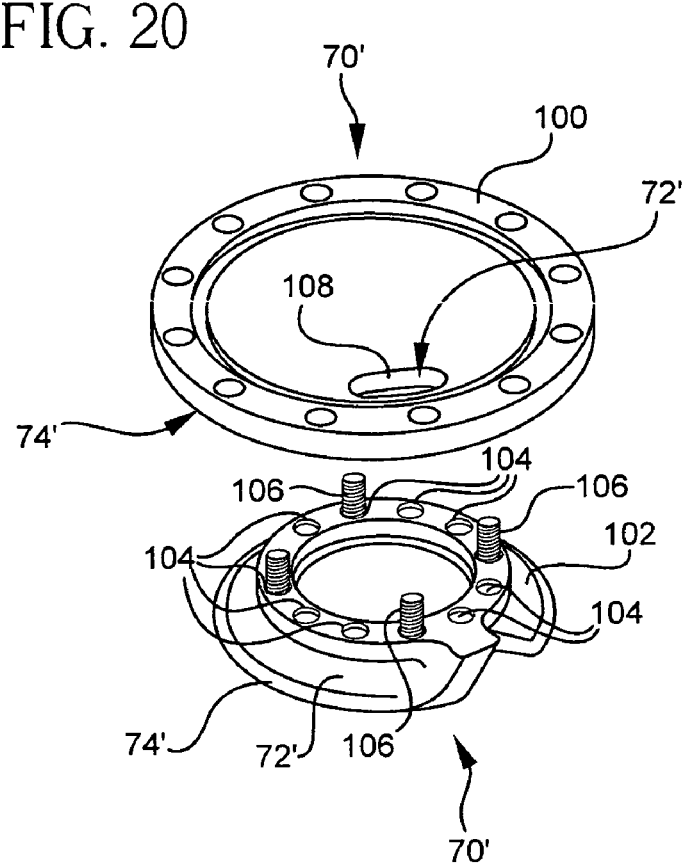
FIG. 20 shows an adjustable liquid track member.
Figure 21A:
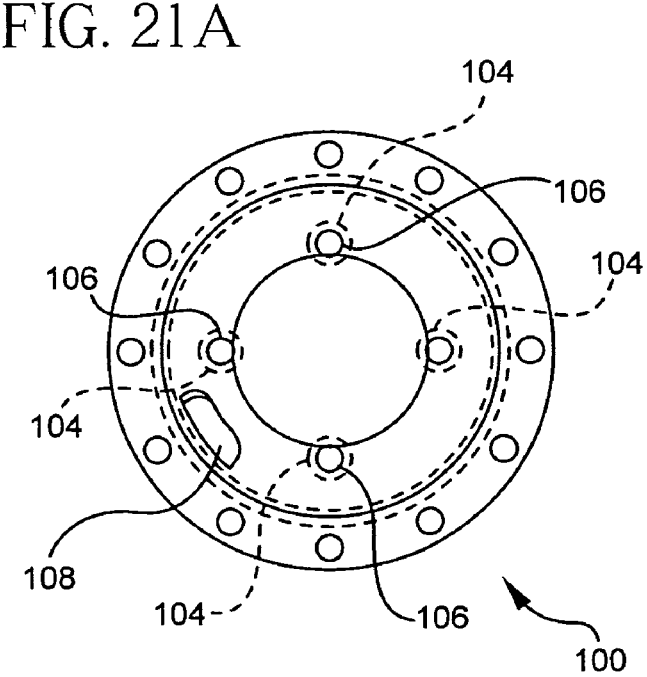
FIGS. 21A-C show views of an adjustable liquid track member component.
Figure 21B:
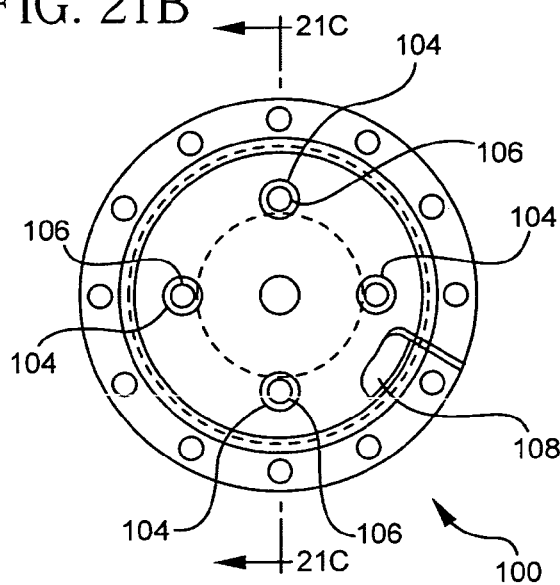
Figure 21C:
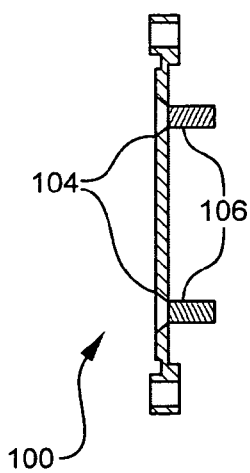
Figure 22A:
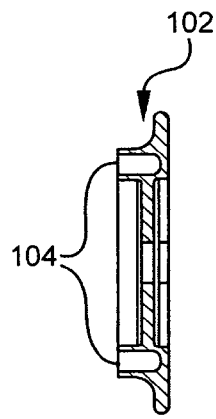
FIGS. 22A-E show views of an adjustable liquid track member component.
Figure 22B:
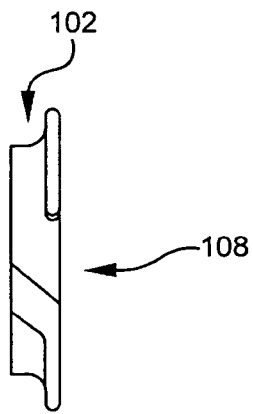
Figure 22C:
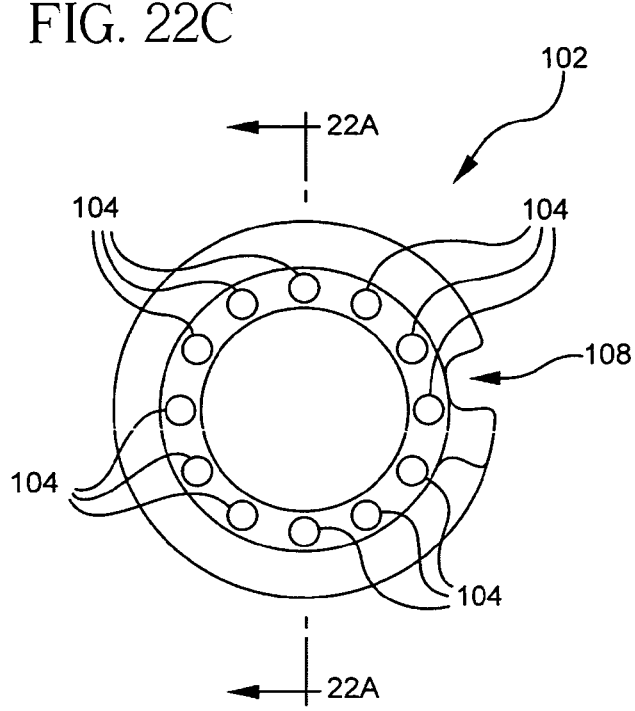
Figure 22D:
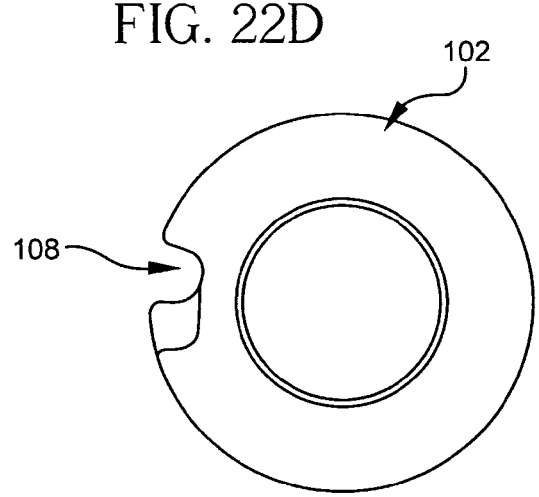
Figure 22E:
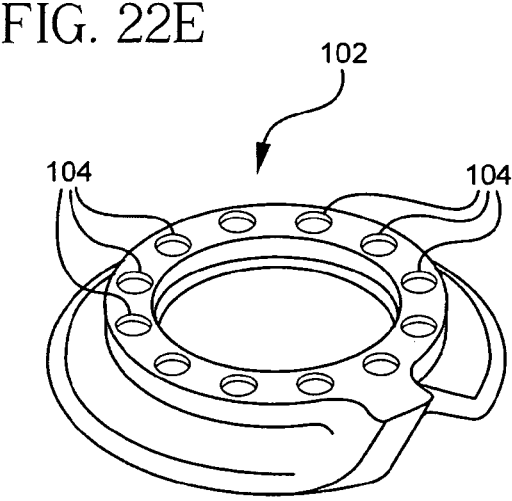
Figure 23:
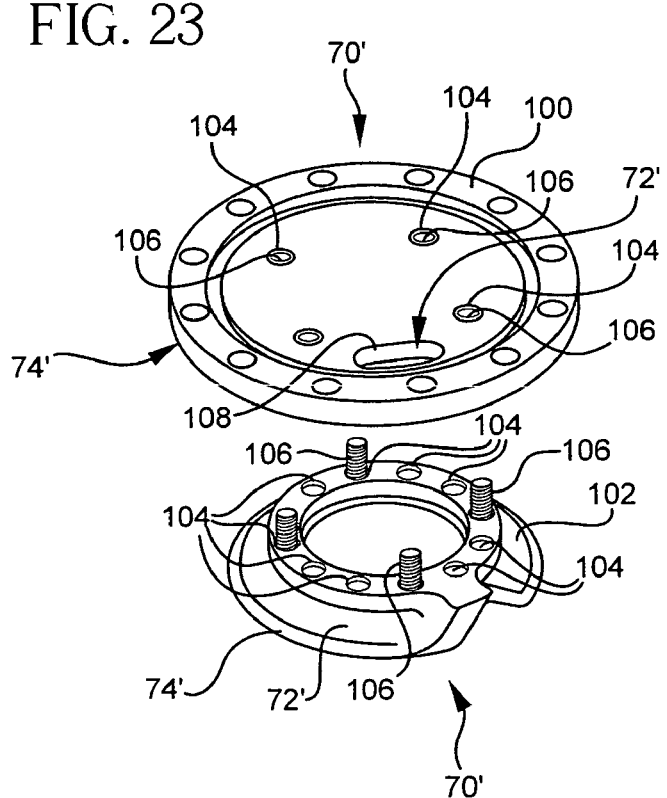
FIG. 23 shows an adjustable liquid track member and method of adjusting track length.
Figure 24:
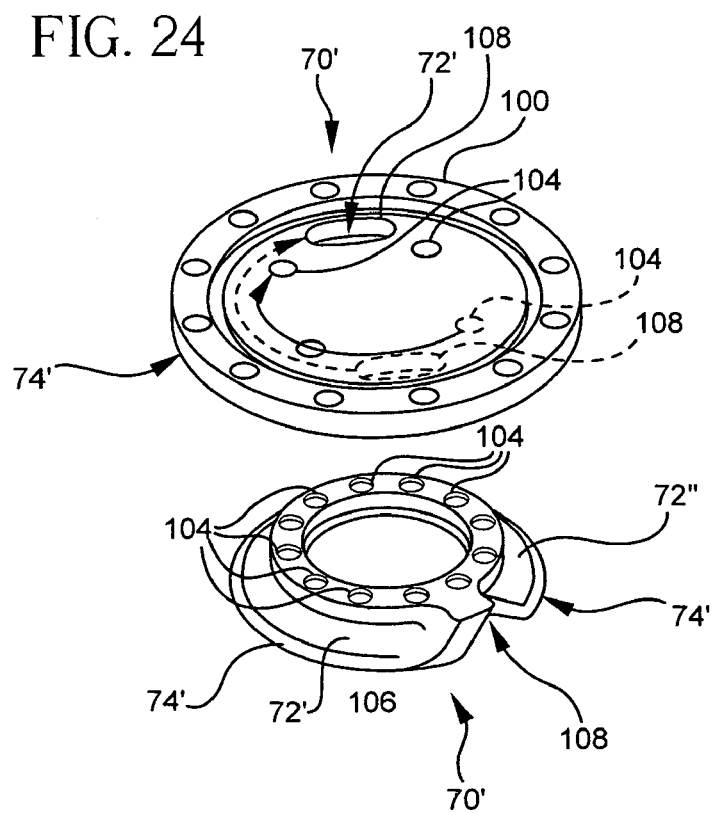
FIG. 24 shows an adjustable liquid track member and method of adjusting track length.
Figure 25:
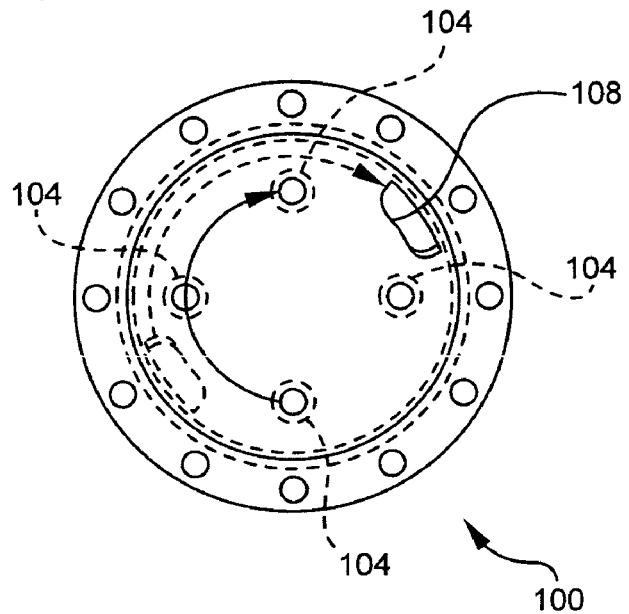
FIG. 25 shows an adjustable liquid track member and method of adjusting track length.
Figure 26:
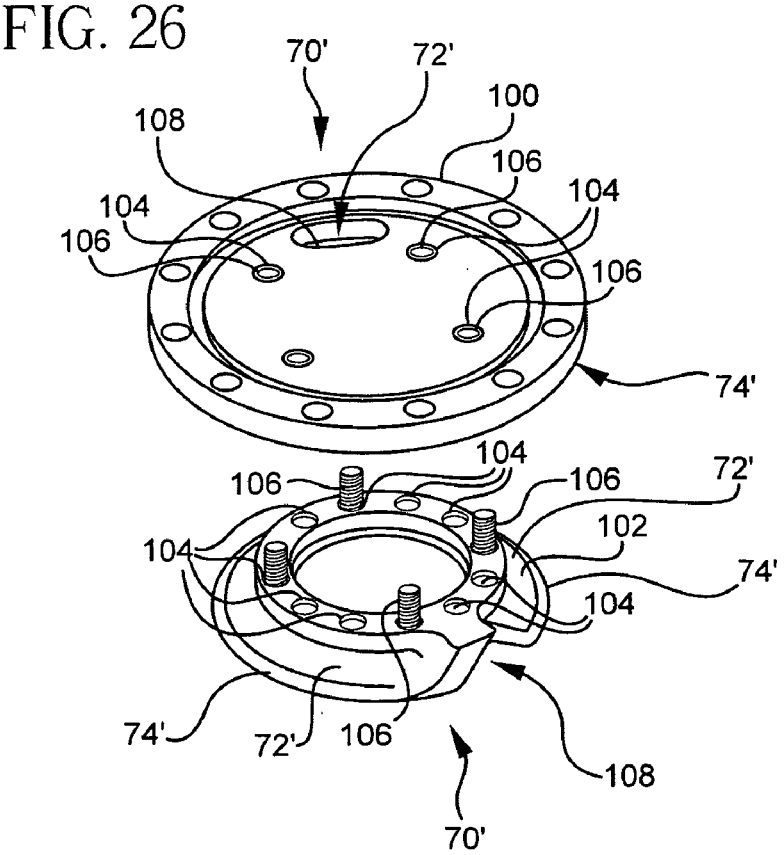
FIG. 26 shows an adjustable liquid track member and method of adjusting track length.
Figure 28:
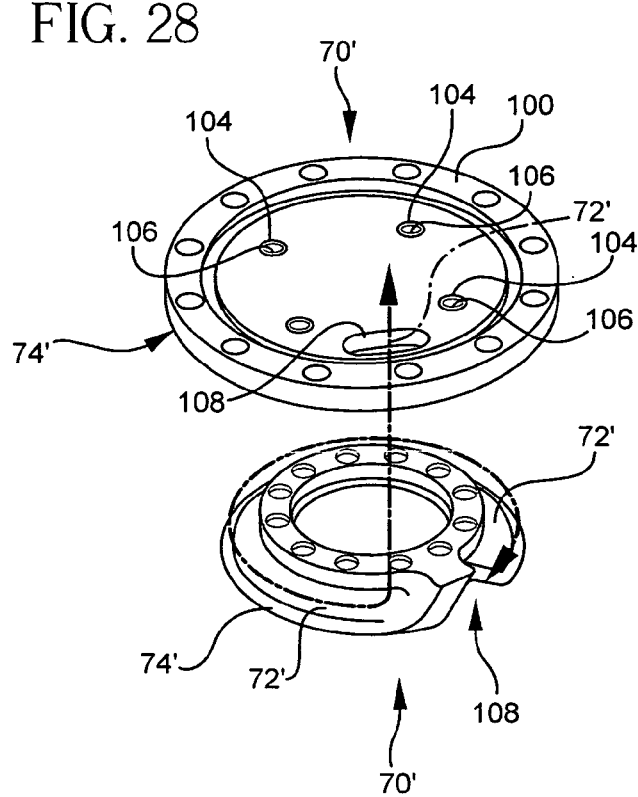
FIG. 28 shows an adjustable liquid track member and method of adjusting track length.
Figure 27:
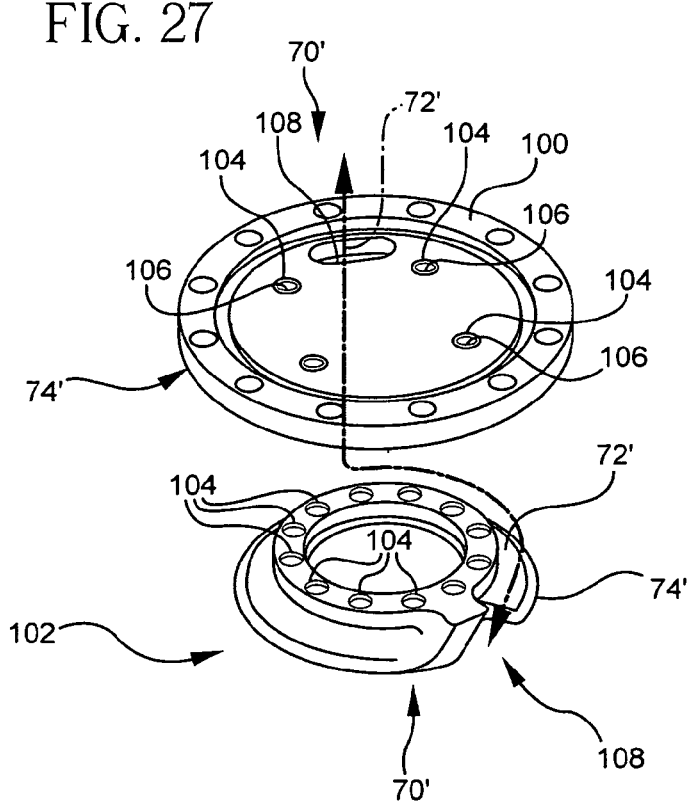
FIG. 27 shows an adjustable liquid track member and method of adjusting track length.
Figure 30A:
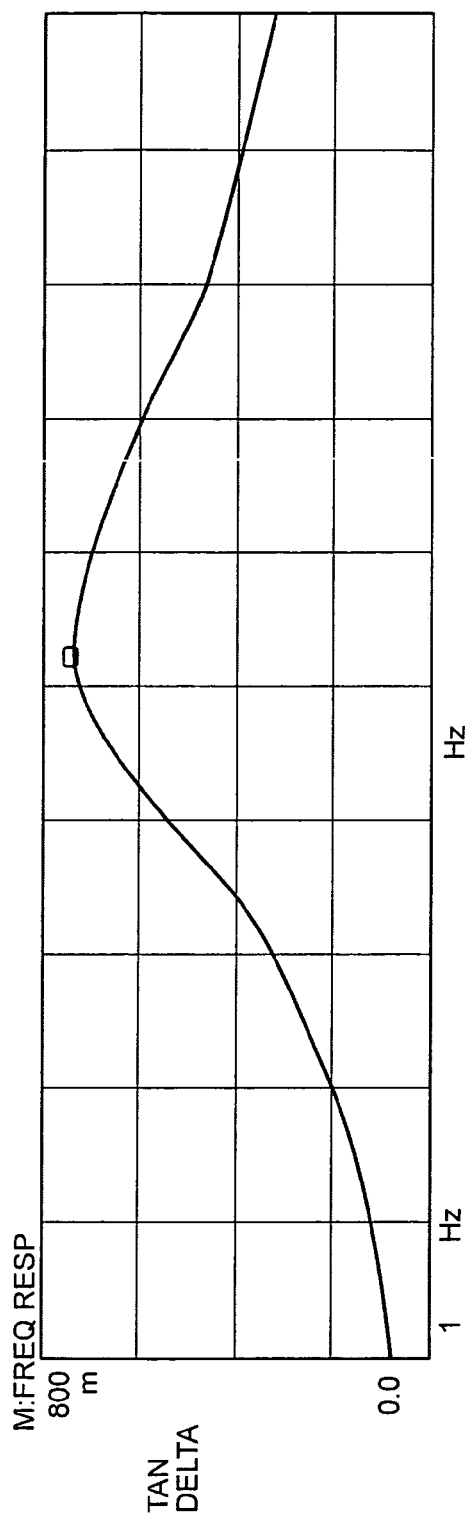
FIGS. 30A-B show stiffness curve frequency notch band plots.
Figure 30B:
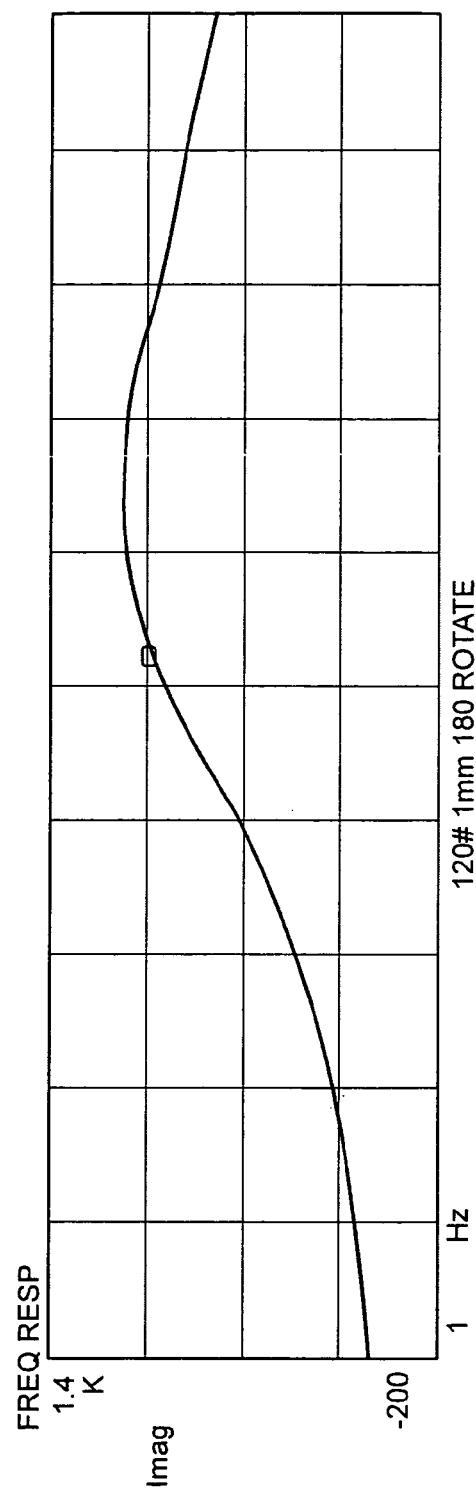

In an embodiment the invention preferably includes an adjustable engine mount 52, having an adjustable band notch frequency band for isolating a vibrating body engine 12 from a frame 10. The adjustable mount 52 preferably includes an adjustable engine mount nonextensible rigid nonelastomer metal inner member 54, the adjustable mount nonextensible inner member 54 having an outer bonding surface 56. The adjustable mount includes an adjustable mount nonextensible outer member 58, the adjustable mount nonextensible outer member having an inner bonding surface 60. The adjustable mount includes an intermediate elastomer 62 between the adjustable mount nonextensible inner member 54 and the adjustable mount nonextensible outer member 58, the adjustable mount intermediate elastomer bonded to the adjustable mount nonextensible inner member outer bonding surface and the adjustable mount nonextensible outer member inner bonding surface. The adjustable mount intermediate elastomer, the adjustable mount nonextensible inner member, and the adjustable mount nonextensible outer member form a liquid housing cavity 64, the liquid housing cavity containing a first variable volume liquid chamber 66 proximate the adjustable mount nonextensible inner member and a second variable volume liquid chamber 68, the second variable volume liquid chamber distal from the adjustable mount nonextensible inner member. The first variable volume liquid chamber 66 is segregated from the second variable volume liquid chamber 68 by a nonextensible rigid inertial adjustable liquid track member 70' having an outer perimeter liquid track path 72' proximate its outer perimeter, preferably formed by the track member perimeter groove 74' and the outer member 58. As shown in FIG. 20, the adjustable liquid track member 70' is comprised of a second variable volume liquid chamber bottom track piece 100 and a first variable volume liquid chamber top track piece 102. As shown in FIGS. 20-28, preferably the second variable volume liquid chamber bottom track piece 100 and the first variable volume liquid chamber top track piece 102 have corresponding periodic attachment point members 104, the top track piece and the bottom track piece attached together with a plurality attachment fixture members 106, such as four attachment fixturing threaded screws, received at the periodic attachment point members 104 with the liquid track path 72' having a first path length, wherein with the attachment fixture members 106 removed, the bottom track piece 100 is separatable from the top piece 102, with the bottom track piece 100 and its liquid entrance track port 108 is rotatably clockable relative to the top track piece 102 and its liquid entrance track port 108 in order to change the liquid track path length 72' to a second track path length 72', with the attachment fixture members 106 re-received at the periodic attachment point members 104 to secure the shorter second track path length 72'. The first variable volume liquid chamber and the second variable volume liquid chamber are filled with the mount liquid 76, the first variable volume liquid chamber in liquid communication with the second variable volume liquid chamber through the outer perimeter liquid track path 72', wherein a movement of the adjustable engine mount nonextensible inner member relative to the adjustable engine mount nonextensible outer member plungers the mount liquid in the first variable volume liquid chamber. Clocking of the output hole liquid entrance track ports 108 of the liquid track along the length of the outer perimeter liquid track path circumference preferably provides at least a third track path length, preferably at least a fourth track path length, preferably at least a fifth track path length, preferably a sixth track path length, preferably a seventh track path length, and preferably a eighth track path length. Preferably the adjustable track path lengths provide an adjustable band notch frequency band with a band center $\geq$W Hz, more preferably $\geq$X-1 Hz. Preferably the adjustable track path lengths provide adjustable band notch frequency bands, preferably within the range of W to Y Hz. Preferably the adjustable track path lengths provides a frequency notch band centered about X Hz (X±5 Hz). Preferably the frequency notch band centered about X Hz with a band width of about 10 Hz. FIGS. 20 and 23 show the output hole liquid entrance track ports 108 positioned to provide a maximum long track path length 72' along the perimeter groove 74' similar to the liquid track path 72 of liquid track member 70 such as shown in FIG. 6, to produce stiffness curves for the mount 52 such as shown in FIGS. 9-16. FIGS. 24-25 show the clocking of the track pieces 100 and 102 of FIG. 23 by 180 degrees to a shorter second track path length 72' after the fixture members 106 have been removed, with the first longer position of port 108 in track piece 100 shown as dashed lines. FIG. 26 shows the fixture members 106 positioned and re-received at the periodic attachment point members 104 to secure the shorter second track path length 72'. FIG. 27 shows the 180 degree clocked shorter second track path length 72' between ports 108, compared to the longer first track path length 72' shown in FIG. 28. FIGS. 29-30 show stiffness curves for the mount 52 utilizing the 180 degree clocked shorter second track path length 72' between ports 108 as shown in FIG. 27. In comparing FIG. 29 with FIG. 9, the band notch frequency band is shifted to the right; with the adjustment of the path length of the adjustable engine mount 52 to a shorter path length adjusting the band notch frequency band to a higher frequency.

Figure 3A:
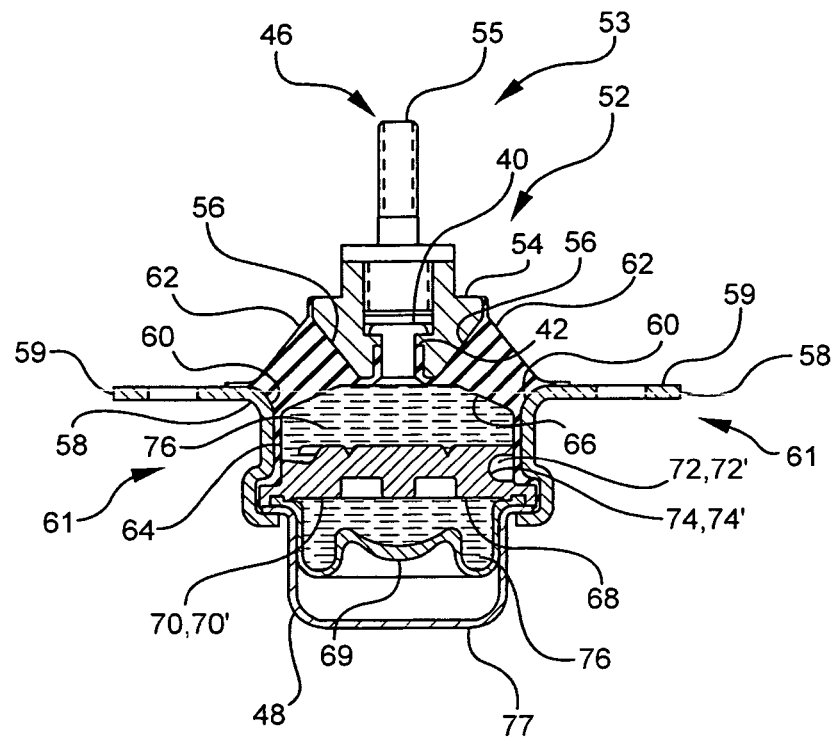
FIGS. 3A-D show a liquid mount.
Figure 3B:
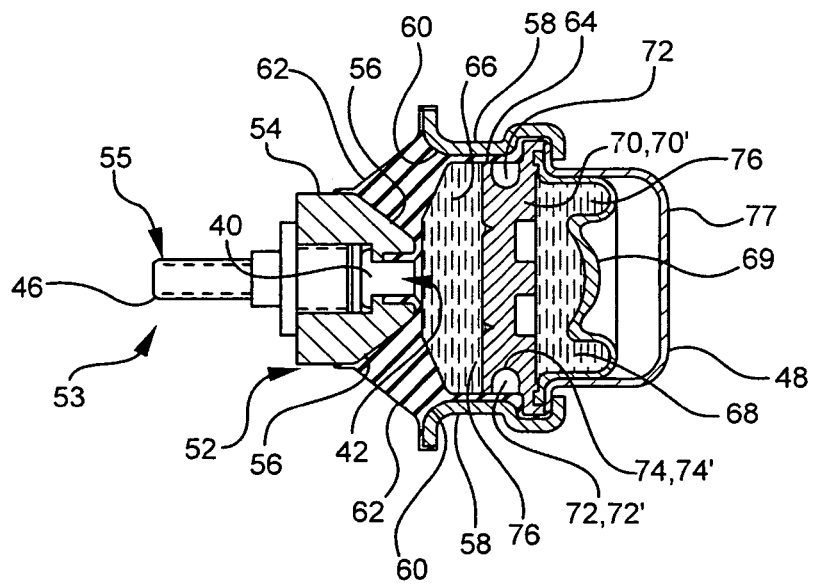
Figure 3C:
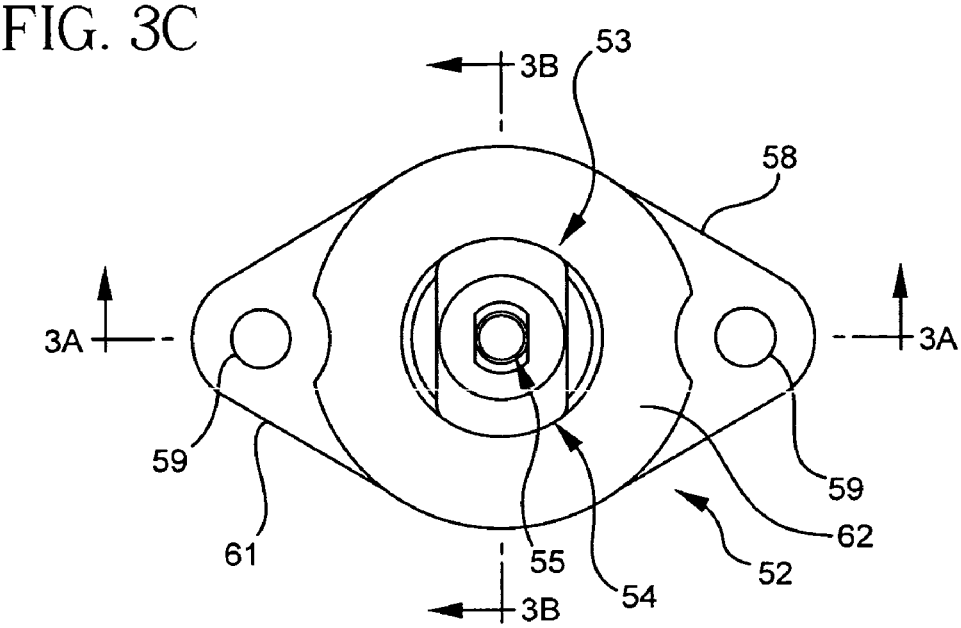
Figure 3D:
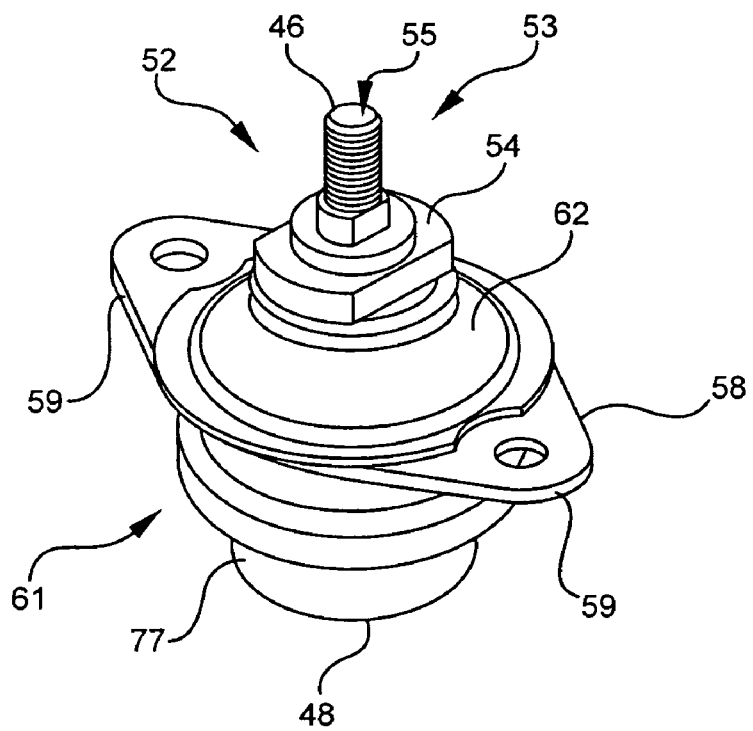
Figure 7A:
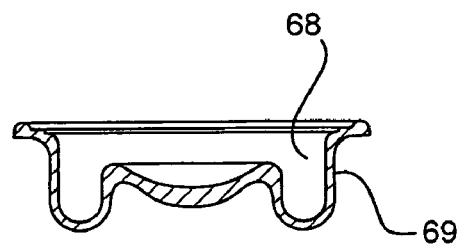
FIGS. 7A-C show views of a liquid mount component.
Figure 7B:
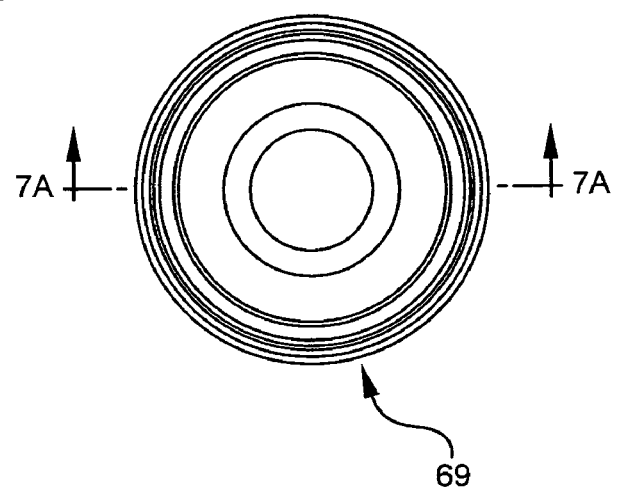
Figure 7C:
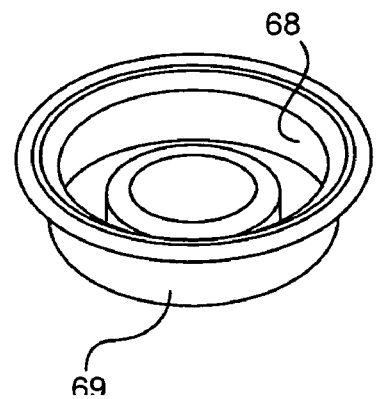
Figure 8A:
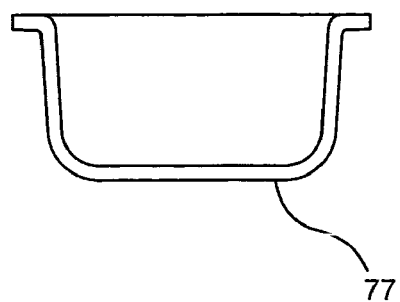
FIGS. 8A-C show views of a liquid mount component.
Figure 8B:
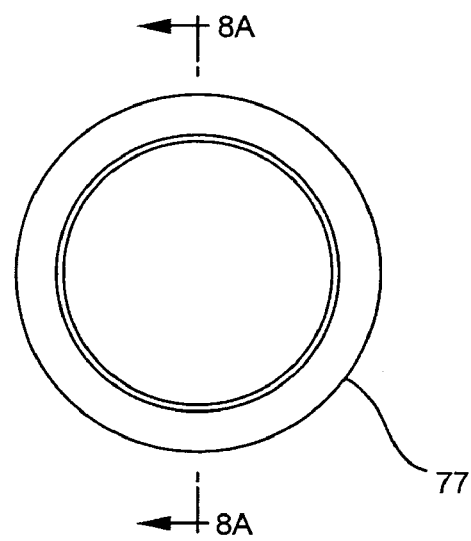
Figure 8C:
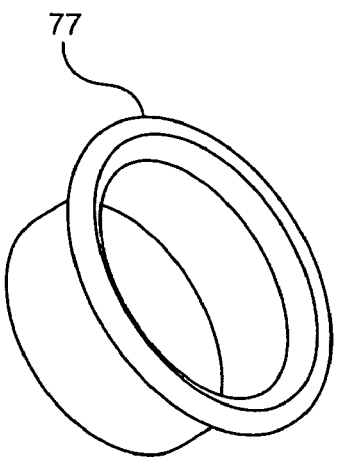
Figure 11A:
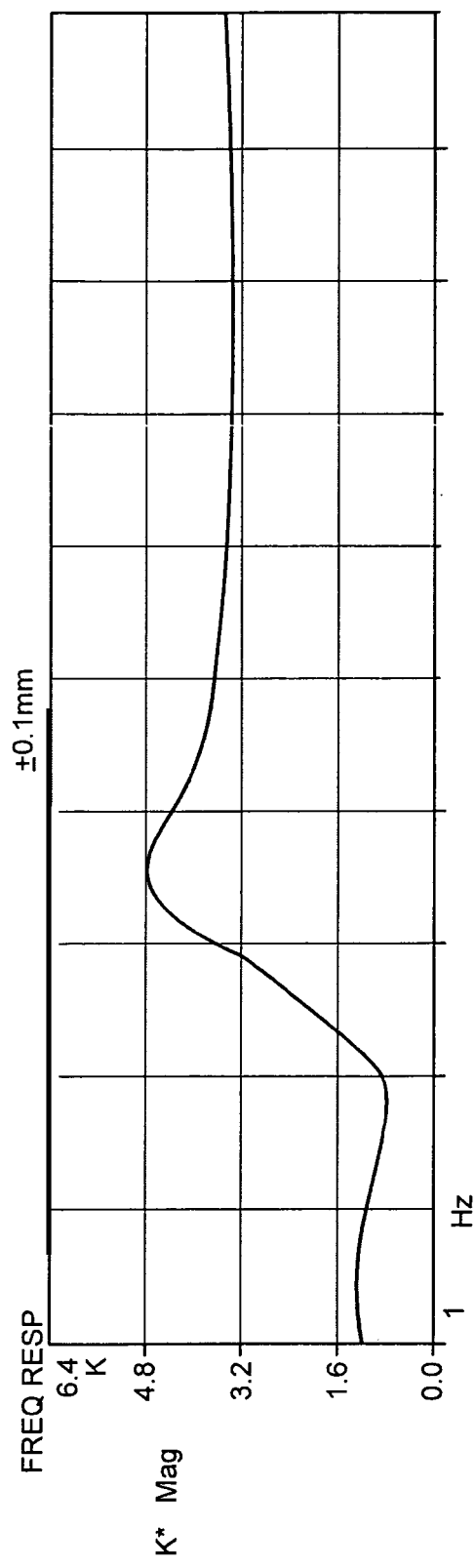
FIGS. 11A-B show stiffness curve frequency notch band plots.
Figure 11B:
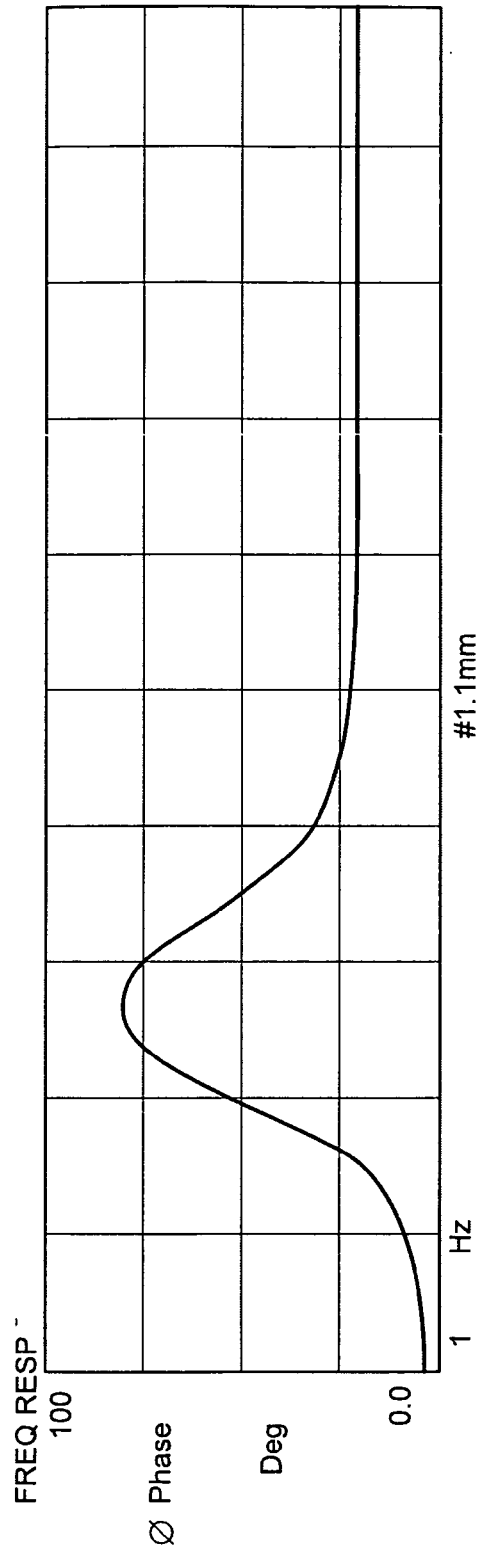
Figure 12A:
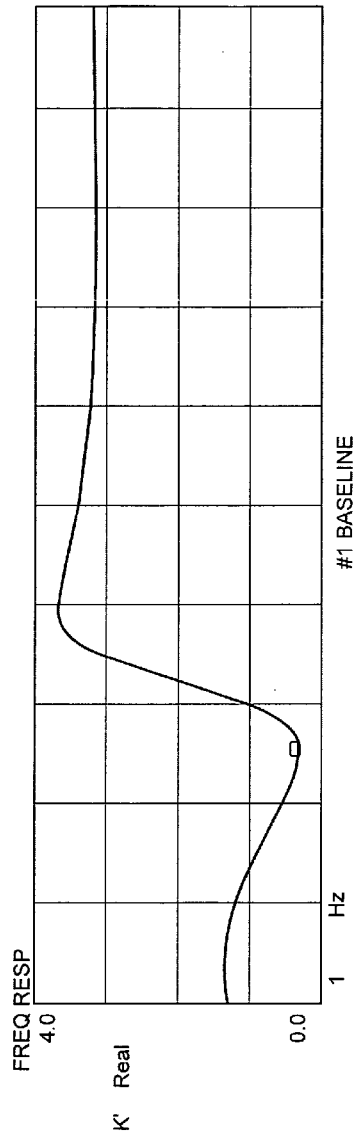
FIGS. 12A-B show stiffness curve frequency notch band plots.
Figure 12B:
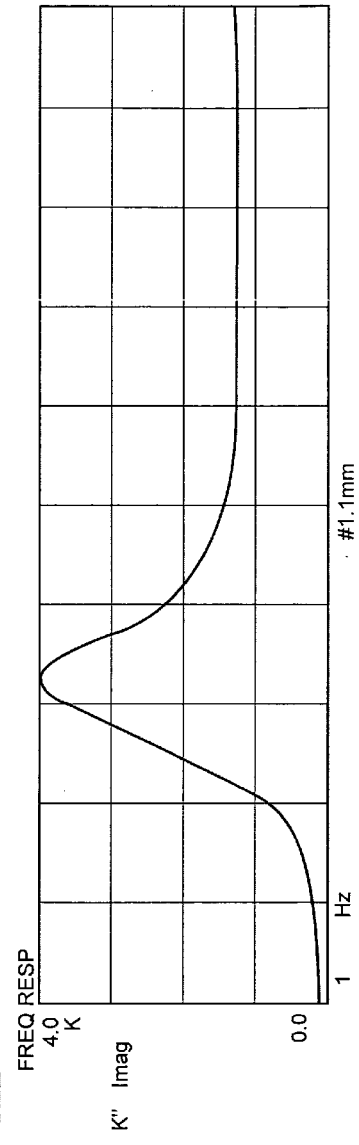
Figure 15A:
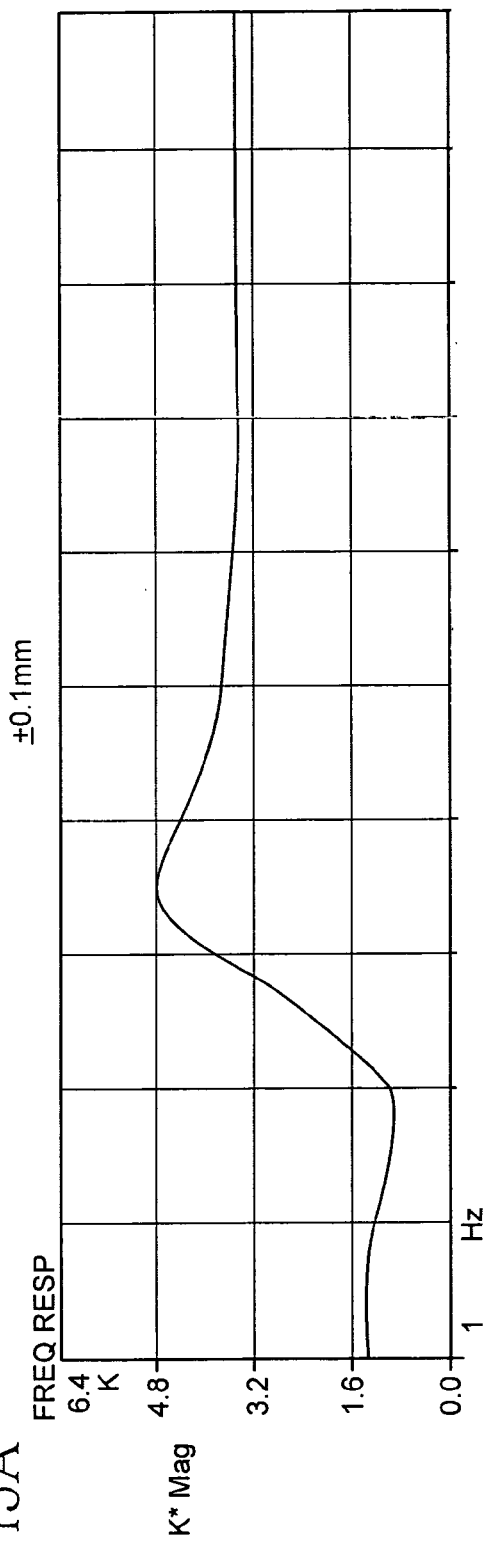
FIGS. 15A-B show stiffness curve frequency notch band plots.
Figure 15B:
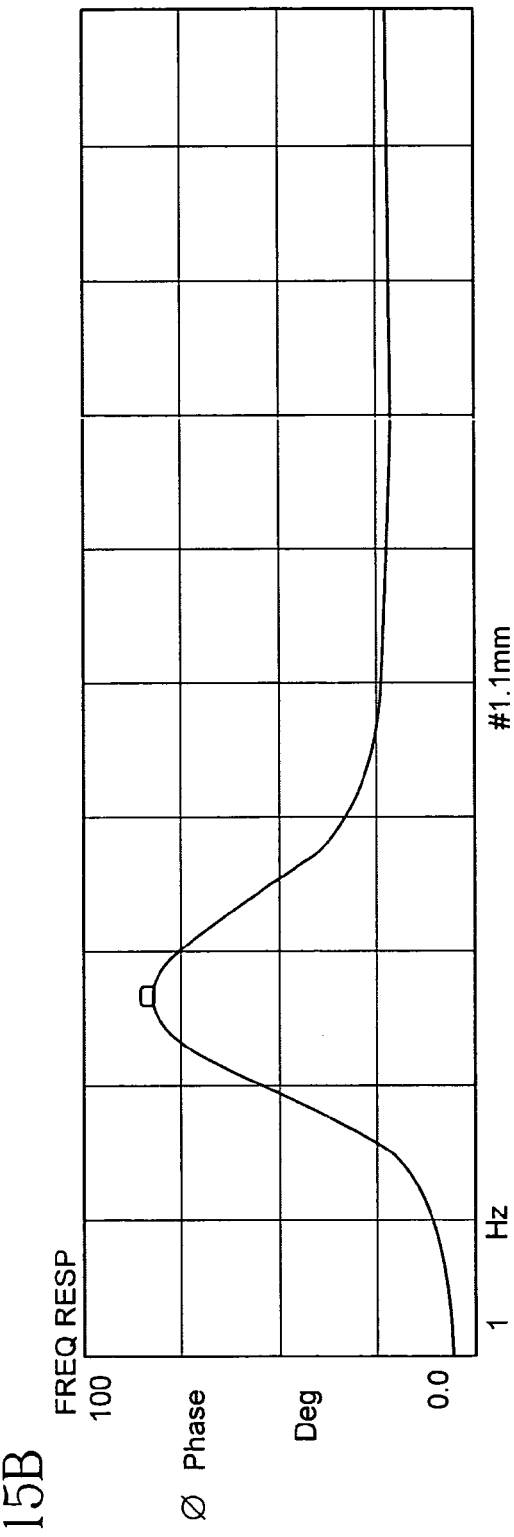

Preferably the invention includes the method of making the equipment engine mount 52 for mounting an equipment engine to an equipment frame. The method includes: providing the equipment engine mount nonextensible rigid nonelastomer metal inner member 54 having an outer bonding surface 56. The nonextensible rigid nonelastomer metal inner member 54 bonded with the intermediate elastomer 62 to the equipment engine mount nonextensible rigid nonelastomer metal outer member 58, with the elastomer 62 between the equipment engine mount nonextensible inner member 54 and outer member 58. The method includes providing an equipment engine mount flexible extensible elastomeric diaphragm 69 such as shown in FIG. 7. The invention includes providing an equipment engine mount nonextensible rigid nonelastomer inertial liquid track member having an outer perimeter tuned liquid track path proximate its outer perimeter. The method includes providing an equipment engine mount housing 77, preferably a rigid nonextensible nonelastomer housing flanged cup member 77 formed from a steel metal material, such as shown in FIG. 8. The method includes assembling the engine mount flexible diaphragm 69, the equipment engine mount nonextensible inertial liquid track member, the equipment engine mount housing 77, and the equipment engine mount nonextensible inner member 54 bonded with the intermediate elastomer 62 to the equipment engine mount nonextensible outer member 58, to provide a liquid housing cavity 64 containing a first variable volume liquid chamber 66 proximate the equipment engine mount nonextensible inner member and a second variable volume liquid chamber 68 adjacent the mount flexible diaphragm 69, the second variable volume liquid chamber 68 distal from the equipment engine mount nonextensible inner member 54 with the first variable volume liquid chamber 66 segregated from the second variable volume liquid chamber 68 by the nonextensible inertial liquid track member. Preferably the assembling includes crimping the outer member 58 to secure the placement of the components. Preferably as shown in FIG. 3A, the outer member 58 is crimped over and around the outer perimeter of the liquid track member, the diaphragm 69, and the housing 77, preferably with the outer perimeter of the diaphragm 69 sandwiched between the housing 77 and the liquid track member, preferably with the elastomer bonded to the outer member 58 extending beyond the liquid track member, and preferably beyond the housing 77. Preferably the first variable volume liquid chamber 66 has an unactuated volume, said unactuated volume preferably greater than the volume of said liquid track member liquid track path. Preferably the second variable volume liquid chamber 68 has an unactuated volume, said unactuated volume preferably greater than the volume of said liquid track member liquid track path. The method includes filling the first variable volume liquid chamber and the second variable volume liquid chamber with the mount liquid 76, the first variable volume liquid chamber 66 in liquid communication with the second variable volume liquid chamber 68 through the liquid track path, wherein a movement of the equipment engine mount nonextensible inner member 54 relative to the equipment engine mount nonextensible outer member 58 plungers the mount liquid in the equipment first variable volume liquid chamber 66. Preferably the mount liquid 76 is comprised of a glycol, preferably comprised of an ethylene glycol, or a propylene glycol, and most preferably a mixture of ethylene glycol and propylene glycol. Preferably the mount liquid 76 has a viscosity less than 100 centipoises, preferably less than 50 centipoises, and most preferably less than 30 centipoises. In a preferred embodiment the mount liquid viscosity is about 22 (±5) centipoises at 75 degrees F., preferably with the liquid having a density of about 0.0395 lbs per inch cubed. Preferably the first engine mount nonextensible inner member 54 defines a liquid fill passage 42, preferably the first engine mount nonextensible inner member outer bonding surface 56 extends into the liquid passage 42 with elastomer 62 bonded to this extending liquid passage outer bonding surface such as shown in FIGS. 4A-B. Preferably the mount liquid 76 filling the mount chambers 66 and 68 is disposed into the mount 52 through the first engine mount nonextensible inner member liquid fill passage 42, then the passage 42 is plugged, preferably with the plug rivet 40 that engages both the metal surfaces of the inner member 54 and the elastomer 62 in the liquid passage 42, preferably with rivet 40 then covered by the engine mounting attachment stud 55 inserted into the inner member 54, preferably with the end of the bonded elastomer/metal interface of passage 42 adjacent the rivet plug 40 and not adjacent the liquid 76 that fills the chambers. Preferably the elastomer 62 is mold bonded to the nonextensible rigid nonelastomer metal members 54 and 58 in a mold 51 such as shown in FIG. 5. Preferably the first engine mount intermediate elastomer component 62 is mold bonded to the first engine mount nonextensible inner member 54 and the first engine mount nonextensible outer member 58 in an elastomer press mold 51, preferably with a rubber to metal bonding adhesive ensuring the bonding of the elastomer 62 to the metal outer bonding surfaces 56 and 60. Preferably the first engine mount intermediate elastomer 62 is a mold bonded elastomeric member with the elastomer bonded to the rigid first engine mount nonextensible inner member and the first engine mount nonextensible outer member during the molding of the elastomer to the rigid metal nonextensible members with a rubber to metal bonding agent, preferably a rubber to metal bonding adhesive such as the Lord Chemlok rubber to metal bonding system, in an elastomer press mold 51 that accepts the rigid metal nonextensible members such as shown in FIG. 5. Preferably the method of making the engine mount 52 includes providing an elastomeric element mold 51 for receiving the nonelastomeric rigid metal nonextensible members, providing an elastomer 62, and molding the elastomer 62 to the nonelastomeric metal nonextensible members inside the mold 51. Preferably the elastomer 62 is comprised of a natural rubber elastomer. In an embodiment such as shown in FIG. 5 molding in the mold includes providing the elastomer 62 as an elastomer transfer stock 63, and transferring the elastomer transfer stock 63 under a pressure into the mold 51, such as through a sprue 49 with the mold 51 comprising close fitting steel metal pieces pressed in place, and vulcanizing curing the elastomer 62 inside the mold 51 under a molding pressure, preferably a molding pressure of at least 300 psi, preferably at least 500 psi.

The invention includes the method of making the equipment engine mounting system 50. The method includes providing the first equipment engine mount nonextensible inner member bonded with the intermediate elastomer to the first equipment engine mount nonextensible outer member. The nonextensible rigid nonelastomer metal inner member 54 bonded with the intermediate elastomer 62 to the equipment engine mount nonextensible rigid nonelastomer metal outer member 58, with the elastomer between the equipment engine mount nonextensible inner member and outer member. The method includes providing an equipment engine mount flexible extensible elastomeric diaphragm 69 such as shown in FIG. 7. The invention includes providing an equipment engine mount nonextensible rigid nonelastomer inertial liquid track member 70, 70' having an outer perimeter tuned liquid track path 72, 72' proximate its outer perimeter. The method includes providing an equipment engine mount housing 77, preferably a rigid nonextensible nonelastomer housing member 77 such as shown in FIG. 8. The method includes assembling the engine mount flexible diaphragm 69, the equipment engine mount nonextensible inertial liquid track member 70, 70', the equipment engine mount housing 77, and the equipment engine mount nonextensible inner member bonded with the intermediate elastomer to the equipment engine mount nonextensible outer member, to provide a liquid housing cavity 64 containing a first variable volume liquid chamber 66 proximate the equipment engine mount nonextensible inner member 54 and a second variable volume liquid chamber 68 adjacent the mount flexible diaphragm 69, the second variable volume liquid chamber distal from the equipment engine mount nonextensible inner member 54 with the first variable volume liquid chamber segregated from the second variable volume liquid chamber by the nonextensible inertial liquid track member 70,70'. The method includes filling the first variable volume liquid chamber 66 and the second variable volume liquid chamber 68 with the mount liquid 76, the first variable volume liquid chamber in liquid communication with the second variable volume liquid chamber through the liquid track path 72, 72' to provide said first liquid mount 52. The method includes providing the second engine mount nonextensible frameside member 80, the second engine mount nonextensible frameside member 80 having an outer bonding surface 82. The method includes providing the second engine mount nonextensible engineside member 84, the second engine mount nonextensible engineside member 84 having an inner bonding surface 86. The method includes providing the highly damped second engine mount elastomer 88 and mold bonding the second engine mount elastomer 88 to the second engine mount nonextensible frameside member 80 and the second engine mount nonextensible engineside member 84, with the highly damped elastomer 88 bonded to the second engine mount nonextensible frameside member outer bonding surface 82 and the second engine mount nonextensible engineside member inner bonding surface 86, to provide a second engine mount 78. The highly damped elastomer 88 having a tan delta of at least 0.2 [damping stiffness/elastic stiffness, (K"/K')]. Preferably the method includes providing the third engine mount 78.

Preferably the invention provides the equipment engine mounting system for mounting a vibrating source equipment engine 12 to a equipment frame 10, the equipment engine mounting system 50 comprised of the first lower mount 52 disposed between the vibrating source 12 and the frame 10, the first mount 52 comprised of the first engine mount nonextensible rigid nonelastomer metal inner member 54, the first engine mount nonextensible inner member 54 having an outer bonding surface 56, the first engine mount 52 comprised of a first engine mount nonextensible rigid nonelastomer metal outer member 58, the first engine mount nonextensible outer member 58 having an inner bonding surface 60, the first engine mount 52 comprised an intermediate elastomer 62 between the first engine mount nonextensible inner member 54 and the first engine mount nonextensible outer member 58, the first engine mount intermediate elastomer 62 bonded to the first engine mount nonextensible inner member outer bonding surface 56 and the first engine mount nonextensible outer member inner bonding surface 60, the first engine mount intermediate elastomer 62, the first engine mount nonextensible inner member 54, and the first engine mount nonextensible outer member 58 forming a liquid housing cavity 64, the liquid housing cavity 64 containing a first variable volume liquid chamber 66 proximate the first engine mount nonextensible inner member 54 and a second variable volume liquid chamber 68, the second variable volume liquid chamber 68 distal from the first engine mount nonextensible inner member 54, the first variable volume liquid chamber 66 segregated from the second variable volume liquid chamber 68 by a nonextensible rigid inertial liquid track member 70, 70' having a outer perimeter tuned liquid track path 72,72' proximate its outer perimeter. Preferably the outer perimeter tuned liquid track path 72 is formed by the track member perimeter groove 74 and the outer member 58 and the bonded elastomer 62, preferably the perimeter groove 74 is a curved circular outer perimeter groove, preferably with a D shaped flat-curved cross section, preferably with the flat side of the D on the bonded elastomer 62 outer member 58 side. Preferably the outer perimeter tuned liquid track path 72' is formed by the track member perimeter groove 74' and the outer member 58 and the bonded elastomer 62, preferably the perimeter groove 74' is a curved circular outer perimeter groove, preferably with a D shaped flat-curved cross section, preferably with the flat side of the D on the bonded elastomer 62 outer member 58 side. The first variable volume liquid chamber 66 and the second variable volume liquid chamber 68 are filled with a mount liquid 76, the first variable volume liquid chamber 66 in liquid communication with the second variable volume liquid chamber 68 through the outer perimeter liquid track path 72,72', wherein a movement of the first mount nonextensible inner member 54 relative to the first engine mount nonextensible outer member 58 plungers the mount liquid 76 in the first variable volume liquid chamber 66. The mounting system includes a second rear engine mount 78 disposed between the equipment engine source 12 and the equipment frame 10, the second engine mount 78 comprised of a second mount nonextensible frameside member 80, the second mount nonextensible frameside member 80 having an outer bonding surface 82, the second mount 78 comprised of a second mount nonextensible engineside member 84, the second engine mount nonextensible engineside member 84 having an inner bonding surface 86, the second mount comprised a highly damped elastomer 88 between the second mount nonextensible frameside member 80 and the second mount nonextensible engineside member 84, the highly damped elastomer 88 bonded to the second mount nonextensible frameside member outer bonding surface 82 and the second mount nonextensible engineside member inner bonding surface 86, the highly damped elastomer 88 having a tan delta of at least 0.2. The system 50 preferably includes the third engine mount 78 disposed between the equipment engine-vibrating source 12 and the equipment frame 10.

The invention preferably includes the engine mount 52 for mounting a vibrating source equipment engine 12 to an equipment frame 10. The equipment engine mount 52 is comprised of the equipment engine mount nonextensible inner member 54, the engine mount nonextensible inner member 54 having an outer bonding surface 56, the engine mount 52 comprised of the equipment engine mount nonextensible outer member 58, the equipment engine mount nonextensible outer member 58 having an inner bonding surface 60, the equipment engine mount 52 comprised the intermediate elastomer 62 between the equipment engine mount nonextensible inner member 54 and the equipment engine mount nonextensible outer member 58, the equipment engine mount intermediate elastomer 62 bonded to the equipment engine mount nonextensible inner member outer bonding surface 56 and the equipment engine mount nonextensible outer member inner bonding surface 60, the equipment engine mount intermediate elastomer 62, the equipment engine mount nonextensible inner member 54, and the equipment engine mount nonextensible outer member 58 forming a liquid housing cavity 64, the liquid housing cavity 64 containing a first variable volume liquid chamber 66 proximate the equipment engine mount nonextensible inner member 54 and a second variable volume liquid chamber 68, the second variable volume liquid chamber 68 distal from the equipment engine mount nonextensible inner member 54, the first variable volume liquid chamber 66 segregated from the second variable volume liquid chamber 68 by a nonextensible rigid nonelastomer inertial liquid track member 70,70' having an outer perimeter tuned liquid track path 72,72' proximate its outer perimeter. Preferably the outer perimeter tuned liquid track path 72 is formed by the track member perimeter groove 74 and the outer member 58 and the bonded elastomer 62, preferably the perimeter groove 74 is a curved circular outer perimeter groove, preferably with a D shaped flat-curved cross section, preferably with the flat side of the D on the bonded elastomer 62 outer member 58 side. Preferably the outer perimeter tuned liquid track path 72' is formed by the track member perimeter groove 74' and the outer member 58 and the bonded elastomer 62, preferably the perimeter groove 74' is a curved circular outer perimeter groove, preferably with a D shaped flat-curved cross section, preferably with the flat side of the D on the bonded elastomer 62 outer member 58 side. The first variable volume liquid chamber 66 and the second variable volume liquid chamber 68 filled with a mount liquid 76, the first variable volume liquid chamber 66 in liquid communication with the second variable volume liquid chamber 68 through the outer perimeter liquid track path 72,72', wherein a movement of the equipment engine mount nonextensible inner member 54 relative to the equipment engine mount nonextensible outer member 58 plungers the mount liquid 76 in the equipment variable volume liquid chamber 66, and preferably moves the mount liquid 76 in the outer perimeter tuned liquid track path with the engine mount 52 having a frequency notch band with a center frequency X Hz (X±5 Hz). Preferably the mount 52 has a frequency notch band in the range from W (X−5) Hz to Y (X+5) Hz. Preferably the frequency notch band is centered about X with a band width of about 10 Hz.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A method of making an equipment engine mounting system for mounting an engine to a frame, said method comprised of:

providing a first equipment engine mount nonextensible inner member bonded with an intermediate elastomer to a first equipment engine mount nonextensible outer member, providing a equipment engine mount flexible diaphragm, providing a equipment engine mount nonextensible inertial liquid track member having a perimeter liquid track path, providing a equipment engine mount housing, assembling said engine mount flexible diaphragm, said equipment engine mount nonextensible inertial liquid track member, said equipment engine mount housing, and said first equipment engine mount nonextensible inner member bonded with said intermediate elastomer to said first equipment engine mount nonextensible outer member to provide a liquid housing cavity containing a first variable volume liquid chamber proximate said equipment engine mount nonextensible inner member and a second variable volume liquid chamber adjacent said mount flexible diaphragm, said second variable volume liquid chamber distal from said equipment engine mount nonextensible inner member with said first variable volume liquid chamber segregated from said second variable volume liquid chamber by said nonextensible inertial liquid track member, filling said first variable volume liquid chamber and said second variable volume liquid chamber with a mount liquid, said first variable volume liquid chamber in liquid communication with said second variable volume liquid chamber through said liquid track path, to provide a first liquid engine mount and disposing said first liquid engine mount between said engine and said frame, providing a second engine mount nonextensible frameside member, said second engine mount nonextensible frameside member having an outer bonding surface, providing a second engine mount nonextensible engineside member, said second engine mount nonextensible engineside member having an inner bonding surface, providing a second engine mount elastomer and a plurality of second engine mount nonextensible rigid nonelastomer shims, and mold bonding said second engine mount elastomer to said second engine mount nonextensible frameside member and said second engine mount nonextensible engineside member with said second engine mount nonextensible rigid nonelastomer shims, with said second engine mount elastomer bonded to said second engine mount nonextensible frameside member outer bonding surface and said second engine mount nonextensible engineside member inner bonding surface with said second engine mount nonextensible rigid nonelastomer shims bonded in said second engine mount elastomer with said second engine mount nonextensible rigid nonelastomer shims oriented in between said second engine mount nonextensible frameside member outer bonding surface and said second engine mount nonextensible engineside member inner bonding surface to provide a second engine mount and disposing said second engine mount between said engine and said frame.

2. A method as claimed in claim 1 said method including providing a third engine mount nonextensible frameside member, said third engine mount nonextensible frameside member having an outer bonding surface, providing a third engine mount nonextensible engineside member, said third engine mount nonextensible engineside member having an inner bonding surface, providing a third engine mount elastomer and a plurality of third engine mount nonextensible rigid nonelastomer shims, and mold bonding said third engine mount elastomer to said third engine mount nonextensible frameside member and said third engine mount nonextensible engineside member with said third engine mount nonextensible rigid nonelastomer shims, with said elastomer bonded to said third engine mount nonextensible frameside member outer bonding surface and said third engine mount nonextensible engineside member inner bonding surface with said third engine mount nonextensible rigid nonelastomer shims bonded in said third engine mount elastomer with said third engine mount nonextensible rigid nonelastomer shims oriented in between said third engine mount nonextensible frameside member outer bonding surface and said third engine mount nonextensible engineside member inner bonding surface to provide a third engine mount and disposing said third engine mount between said engine and said frame.

3. A method as claimed in claim 2, said method including providing a liquid mount elastomeric mold, and mold bonding said first equipment engine mount nonextensible inner member with said intermediate elastomer to said first equipment engine mount nonextensible outer member in said liquid mount elastomeric mold, said first liquid engine mount disposed between said engine and said frame in front of a middle center of said engine, and said second and third engine mounts disposed between said engine and said frame rear of said middle center of said engine with said third engine mount proximate said second engine mount with said second and third engine mounts left and right hand mirror image pairs.

4. A method as claimed in claim 1, wherein filling said first variable volume liquid chamber and said second variable volume liquid chamber with a mount liquid comprises filling with a glycol mount liquid through a liquid fill passage and plugging said liquid fill passage with a plug rivet.

\* \* \* \* \*